(12) United States Patent
Ciuperca

(10) Patent No.: US 9,458,637 B2
(45) Date of Patent: Oct. 4, 2016

(54) COMPOSITE INSULATED PLYWOOD, INSULATED PLYWOOD CONCRETE FORM AND METHOD OF CURING CONCRETE USING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 0 days.

(21) Appl. No.: 13/626,103

(22) Filed: Sep. 25, 2012

(65) Prior Publication Data
US 2014/0084132 A1    Mar. 27, 2014

(51) Int. Cl.
*E04G 9/10*  (2006.01)
*E04G 9/04*  (2006.01)
*E04G 9/02*  (2006.01)

(52) U.S. Cl.
CPC . *E04G 9/10* (2013.01); *E04G 9/04* (2013.01); *E04G 2009/028* (2013.01)

(58) Field of Classification Search
CPC ............ E04G 9/02; E04G 9/04; E04G 9/05; E04G 9/06; E04G 9/10; E04G 11/08; E04G 11/10; E04G 2009/028
USPC ....... 249/189, 190, 191, 192, 193, 194, 195, 249/196, 33, 34, 35, 36, 37, 38, 39, 40, 41, 249/42, 43, 44, 45, 46, 47; 52/797.1, 801.1, 52/801.11, 801.12, 800.1
See application file for complete search history.

(56) References Cited

U.S. PATENT DOCUMENTS

| | | | |
|---|---|---|---|
| 2,053,135 A * | 9/1936 | Dalton | 52/801.11 |
| 2,057,732 A | 10/1936 | Navarre | |
| 3,022,196 A * | 2/1962 | Jenkins et al. | 106/287.11 |
| 3,144,701 A * | 8/1964 | Bowden | 249/196 |
| 3,163,911 A * | 1/1965 | Kenney | E04G 11/12 248/218.4 |
| 3,199,828 A | 8/1965 | Newton | |
| 3,260,495 A | 7/1966 | Buyken | |
| 3,381,929 A * | 5/1968 | Bancker | 249/5 |

(Continued)

FOREIGN PATENT DOCUMENTS

| | | | | |
|---|---|---|---|---|
| EP | 0315323 | * | 5/1989 | E04G 9/10 |
| EP | 2065530 A2 | | 3/2009 | |

(Continued)

OTHER PUBLICATIONS

International Search Report and Written Opinion dated Dec. 17, 2012, PCT/US2012/056811 corresponding to U.S. Appl. No. 13/247,133, filed Sep. 28, 2011.
Office Action dated Jan. 4, 2013, U.S. Appl. No. 12/753,220, filed Apr. 2, 2010.
Office Action dated Dec. 27, 2012, U.S. Appl. No. 13/626,075, filed Sep. 25, 2012.

(Continued)

*Primary Examiner* — Michael Safavi
(74) *Attorney, Agent, or Firm* — Robert E. Richards; Richards IP Law

(57) ABSTRACT

The invention comprises a concrete form. The concrete form comprises a first panel having a first primary surface for contacting plastic concrete and a second primary surface opposite the first surface; and a second panel having a first primary surface and a second primary surface opposite the first surface, the second panel being attached to the first panel so that the first primary surface of the second panel is adjacent the second primary surface of the first panel. The concrete form also comprises a layer of radiant heat reflective material and a layer of insulating material disposed between and covering the second primary surface of the first panel and first primary surface of the second panel. A method of using the concrete form is also disclosed.

10 Claims, 14 Drawing Sheets

(56) References Cited

U.S. PATENT DOCUMENTS

| | | | | |
|---|---|---|---|---|
| 3,435,573 A | * | 4/1969 | Krone | E04F 13/0885 52/272 |
| 3,596,351 A | | 8/1971 | Tilton et al. | |
| 3,649,725 A | | 3/1972 | Olson | |
| 3,732,138 A | * | 5/1973 | Almog | 428/114 |
| 3,819,143 A | * | 6/1974 | Butts | E04B 5/29 249/189 |
| 3,985,329 A | | 10/1976 | Liedgens | |
| 3,996,713 A | | 12/1976 | Haeussler | |
| 4,059,936 A | | 11/1977 | Lukens | |
| 4,085,495 A | | 4/1978 | Hebert | |
| 4,090,336 A | | 5/1978 | Carroll | |
| 4,150,808 A | * | 4/1979 | Sawyer | 249/111 |
| 4,157,638 A | | 6/1979 | Della-Donna | |
| 4,211,385 A | * | 7/1980 | Johanson et al. | 249/192 |
| 4,221,097 A | * | 9/1980 | Dingler | 249/189 |
| 4,283,896 A | | 8/1981 | Fricker et al. | |
| 4,349,398 A | | 9/1982 | Kearns et al. | |
| 4,370,840 A | | 2/1983 | Bisbee et al. | |
| 4,394,529 A | * | 7/1983 | Gounder | 136/245 |
| 4,426,061 A | | 1/1984 | Taggart | |
| 4,489,121 A | * | 12/1984 | Luckanuck | 428/192 |
| 4,553,729 A | * | 11/1985 | Connors | E04G 11/062 249/191 |
| 4,585,685 A | * | 4/1986 | Forry et al. | 428/143 |
| 4,628,653 A | | 12/1986 | Nash | |
| 4,646,498 A | * | 3/1987 | Schneller et al. | 52/309.12 |
| 4,669,234 A | | 6/1987 | Wilnau | |
| 4,744,849 A | | 5/1988 | Michaud-Soret | |
| 4,765,109 A | | 8/1988 | Boeshart | |
| 4,784,902 A | * | 11/1988 | Crompton | 442/373 |
| 4,811,927 A | * | 3/1989 | Slonimsky et al. | 249/210 |
| 4,829,733 A | | 5/1989 | Long | |
| 4,832,308 A | * | 5/1989 | Slonimsky et al. | 249/78 |
| 4,866,897 A | * | 9/1989 | Yount | 52/363 |
| 4,885,888 A | | 12/1989 | Young | |
| 4,889,310 A | | 12/1989 | Boeshart | |
| 4,907,386 A | | 3/1990 | Ekroth | |
| 4,974,381 A | | 12/1990 | Marks | |
| 5,095,674 A | | 3/1992 | Huettemann | |
| 5,107,648 A | | 4/1992 | Roby | |
| 5,171,118 A | | 12/1992 | Rothenbuhler | |
| 5,217,339 A | | 6/1993 | O'Connor et al. | |
| 5,323,578 A | * | 6/1994 | Chagnon et al. | 52/426 |
| 5,440,845 A | | 8/1995 | Tadros et al. | |
| 5,451,451 A | * | 9/1995 | Minnick | 442/247 |
| 5,493,837 A | | 2/1996 | Hepler | |
| 5,497,592 A | | 3/1996 | Boeshart | |
| 5,537,797 A | * | 7/1996 | Harkenrider | E04G 9/05 249/43 |
| 5,549,956 A | | 8/1996 | Handwerker | |
| 5,570,550 A | | 11/1996 | Roby | |
| 5,595,171 A | | 1/1997 | Makin | |
| 5,606,832 A | | 3/1997 | Keith et al. | |
| 5,611,182 A | | 3/1997 | Spude | |
| 5,624,491 A | | 4/1997 | Liskowitz et al. | |
| 5,707,179 A | | 1/1998 | Bruckelmyer | |
| 5,765,318 A | | 6/1998 | Michelsen | |
| 5,780,367 A | | 7/1998 | Handwerker | |
| 5,792,552 A | * | 8/1998 | Langkamp et al. | 428/309.9 |
| 5,809,723 A | | 9/1998 | Keith et al. | |
| 5,809,725 A | | 9/1998 | Cretti | |
| 5,809,726 A | | 9/1998 | Spude | |
| 5,809,728 A | | 9/1998 | Tremelling | |
| 5,852,907 A | | 12/1998 | Tobin et al. | |
| 5,855,978 A | | 1/1999 | Handwerker | |
| 5,874,150 A | | 2/1999 | Handwerker | |
| 5,966,885 A | | 10/1999 | Chatelain | |
| 5,992,114 A | | 11/1999 | Zelinsky et al. | |
| 5,996,297 A | | 12/1999 | Keith et al. | |
| 6,026,620 A | | 2/2000 | Spude | |
| 6,079,176 A | | 6/2000 | Westra et al. | |
| 6,086,349 A | | 7/2000 | Del Monte | |
| 6,088,985 A | | 7/2000 | Clark | |
| 6,134,861 A | | 10/2000 | Spude | |
| 6,138,981 A | | 10/2000 | Keith et al. | |
| 6,230,462 B1 | | 5/2001 | Beliveau | |
| 6,234,736 B1 | | 5/2001 | Miescher | |
| 6,263,638 B1 | | 7/2001 | Long, Sr. | |
| 6,272,805 B1 | | 8/2001 | Ritter et al. | |
| 6,276,104 B1 | | 8/2001 | Long, Sr. et al. | |
| 6,279,285 B1 | | 8/2001 | Kubica | |
| 6,296,224 B1 | * | 10/2001 | Hayakawa | E04G 9/05 249/192 |
| 6,314,694 B1 | | 11/2001 | Cooper et al. | |
| 6,318,040 B1 | | 11/2001 | Moore, Jr. | |
| 6,336,301 B1 | | 1/2002 | Moore, Jr. | |
| 6,360,505 B1 | | 3/2002 | Johns | |
| 6,412,245 B1 | | 7/2002 | Lane et al. | |
| 6,426,029 B1 | | 7/2002 | Hiscock et al. | |
| 6,609,340 B2 | | 8/2003 | Moore, Jr. et al. | |
| 6,612,083 B1 | | 9/2003 | Richards | |
| 6,647,686 B2 | | 11/2003 | Dunn et al. | |
| 6,688,066 B1 | | 2/2004 | Cottier et al. | |
| 6,705,055 B2 | | 3/2004 | Ritter et al. | |
| 6,711,862 B1 | | 3/2004 | Long | |
| 6,725,616 B1 | | 4/2004 | Pease | |
| 6,761,007 B2 | | 7/2004 | Lancelot, III et al. | |
| 6,817,150 B1 | | 11/2004 | Boeshart | |
| 6,818,058 B2 | | 11/2004 | Ronin | |
| 6,874,749 B2 | * | 4/2005 | Wells | 249/191 |
| 6,898,908 B2 | | 5/2005 | Messenger et al. | |
| 6,898,912 B2 | | 5/2005 | Bravinski | |
| 6,915,613 B2 | | 7/2005 | Wostal et al. | |
| 6,935,081 B2 | | 8/2005 | Dunn et al. | |
| 6,945,506 B2 | | 9/2005 | Long, Sr. | |
| 6,948,289 B2 | | 9/2005 | Bravinski | |
| 7,000,359 B2 | | 2/2006 | Meyer | |
| 7,124,547 B2 | | 10/2006 | Bravinski | |
| 7,183,524 B2 | | 2/2007 | Naylor et al. | |
| 7,206,726 B2 | | 4/2007 | Seeber et al. | |
| 7,230,213 B2 | | 6/2007 | Naylor | |
| 7,368,150 B2 | | 5/2008 | Pritchett | |
| 7,409,800 B2 | | 8/2008 | Budge | |
| 7,491,268 B2 | | 2/2009 | Hoffis | |
| 7,523,591 B2 | * | 4/2009 | Di Lorenzo | E01F 8/0029 52/414 |
| 7,625,827 B2 | | 12/2009 | Egan et al. | |
| 7,765,761 B2 | | 8/2010 | Paradis | |
| 7,818,935 B2 | | 10/2010 | Velickovic | |
| 7,871,055 B1 | * | 1/2011 | Dagher et al. | 249/195 |
| 8,322,600 B2 | | 12/2012 | Vitt | |
| 2002/0005725 A1 | | 1/2002 | Scott | |
| 2002/0014048 A1 | | 2/2002 | Meendering | |
| 2002/0017070 A1 | | 2/2002 | Batch | |
| 2002/0092253 A1 | | 7/2002 | Beliveau | |
| 2003/0115831 A1 | | 6/2003 | Long, Sr. | |
| 2003/0192272 A1 | | 10/2003 | Bravinski | |
| 2004/0020147 A1 | | 2/2004 | Martella et al. | |
| 2004/0129857 A1 | | 7/2004 | Musk et al. | |
| 2005/0102968 A1 | | 5/2005 | Long, Sr. et al. | |
| 2005/0108985 A1 | | 5/2005 | Bravinski | |
| 2006/0080923 A1 | | 4/2006 | Fleischhacker | |
| 2007/0062143 A1 | | 3/2007 | Noushad | |
| 2007/0094974 A1 | | 5/2007 | Velickovic | |
| 2007/0095255 A1 | | 5/2007 | Abbate et al. | |
| 2007/0231576 A1 | * | 10/2007 | Davis et al. | 428/412 |
| 2008/0041004 A1 | | 2/2008 | Gibbar et al. | |
| 2008/0173788 A1 | * | 7/2008 | Brewka et al. | 249/189 |
| 2008/0221815 A1 | | 9/2008 | Trost et al. | |
| 2008/0313991 A1 | | 12/2008 | Chouinard | |
| 2009/0000241 A1 | | 1/2009 | Long, Sr. | |
| 2009/0202307 A1 | | 8/2009 | Au et al. | |
| 2009/0218474 A1 | | 9/2009 | Bowman | |
| 2009/0229214 A1 | | 9/2009 | Nelson | |
| 2009/0277103 A1 | * | 11/2009 | De Jaham | 52/93.1 |
| 2010/0050553 A1 | * | 3/2010 | Schofield | 52/469 |
| 2010/0066121 A1 | * | 3/2010 | Gross | 296/146.5 |
| 2010/0090089 A1 | * | 4/2010 | Koegel | 249/189 |
| 2010/0162659 A1 | * | 7/2010 | Laprise | 52/762 |
| 2010/0192498 A1 | * | 8/2010 | Gleckman | 52/475.1 |
| 2010/0212552 A1 | | 8/2010 | Stratton et al. | |
| 2010/0232877 A1 | | 9/2010 | Sanvik et al. | |
| 2010/0255277 A1 | | 10/2010 | Platt et al. | |

(56) References Cited

U.S. PATENT DOCUMENTS

| | | | |
|---|---|---|---|
| 2010/0319295 | A1 | 12/2010 | Nelson |
| 2011/0061329 | A1 | 3/2011 | Tadros et al. |
| 2012/0058299 | A1 | 3/2012 | Serwin |
| 2012/0097073 | A1 | 4/2012 | Lambrechts |

FOREIGN PATENT DOCUMENTS

| | | |
|---|---|---|
| JP | 7224478 | 8/1995 |
| JP | 10-46716 | 2/1998 |
| JP | 11-256734 | 9/1999 |
| JP | 11-350732 | 12/1999 |
| JP | 11350732 | 12/1999 |
| JP | 2000-240214 | 9/2000 |
| JP | 2002128559 | 5/2002 |
| WO | 9512042 | 8/1995 |
| WO | 9735071 | 9/1997 |
| WO | 99/18302 | 4/1999 |
| WO | 9918302 A1 | 4/1999 |
| WO | 9953154 | 10/1999 |
| WO | 2005113228 A2 | 12/2005 |
| WO | 2009072795 A2 | 6/2009 |
| WO | 2012080323 | 6/2012 |
| WO | 2012080326 | 6/2012 |

OTHER PUBLICATIONS

Palmer, et al., Separation of Fly Ash Using Density Gradient Centrifugation, 1995, Coal Science, vol. 2, pp. 1999-2000.
Reward Wall Systems—iForm Installation Procedures (Mar. 2011).
Transform Manual (Mar. 12, 2011).
PCT/US/2011/030512 ISR and Written Opinion, Jan. 2, 2012.
Tilt-Up Concrete Structures, Reported by ACI Committee 551 (1997, 2003).
Concrete & Masonry, Power Blanket (2009-2012).
Insul-Tarp Specification Information (Oct. 2009).
Portland Cement Association, Supplementary Cementing Materials for Use in Blended Cements (1996).
Fly Ash for Insulating Concrete Form Construction (Mar./May).
PCT International Search Report and Written Opinion, dated Dec. 3, 2012 in PCT/US2012/056811, filed Sep. 24, 2012, which claims priority to U.S. Appl. No. 13/247,133, filed Sep. 28, 2011.
International Search Report and Written Opinion dated Dec. 27, 2012, PCT/US12/57103 filed Sep. 25, 2012 corresponding to U.S. Appl. No. 13/626,540, filed Sep. 25, 2012.
PCT International Search Report and Written Opinion, dated Dec. 30, 2013 in PCT/US2013/61237, filed Sep. 23, 2013, which claims priority to U.S. Appl. No. 13/626,075, filed Sep. 25, 2012.
International Search Report and Written Opinion dated Dec. 24, 2013, PCT/US13/61238 filed Sep. 23, 2013 corresponding to U.S. Appl. No. 13/626,087, filed Sep. 25, 2012.

\* cited by examiner

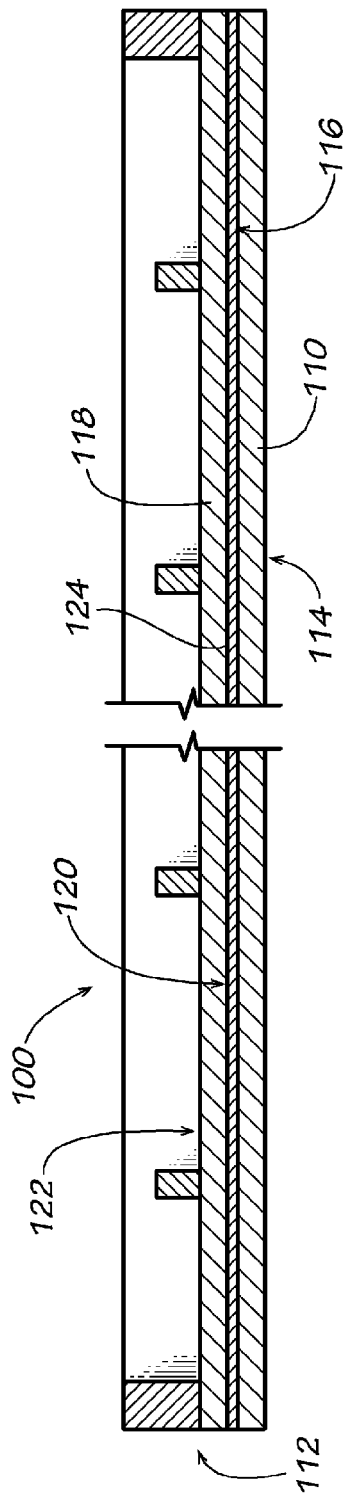
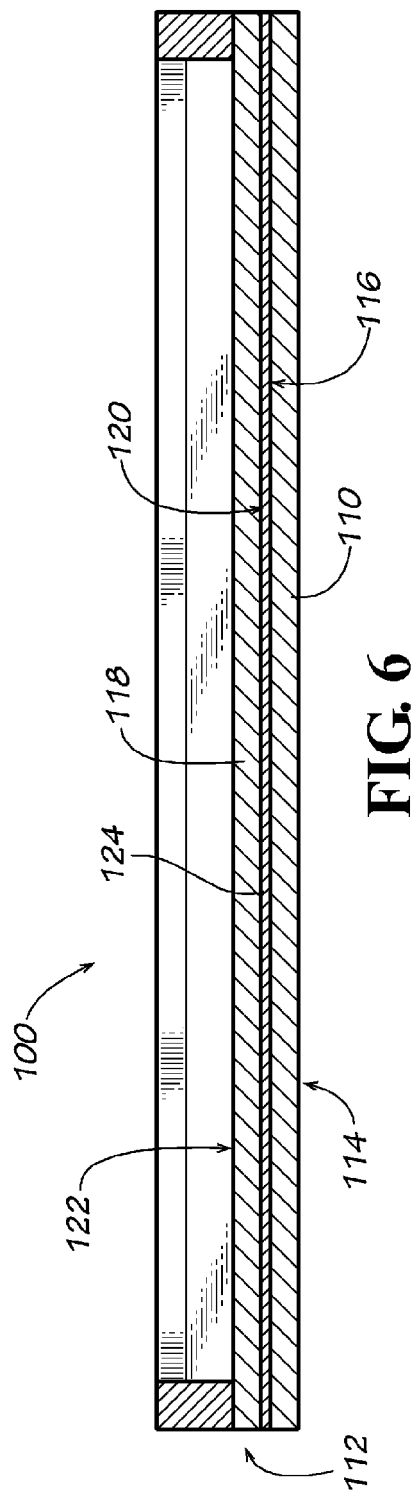

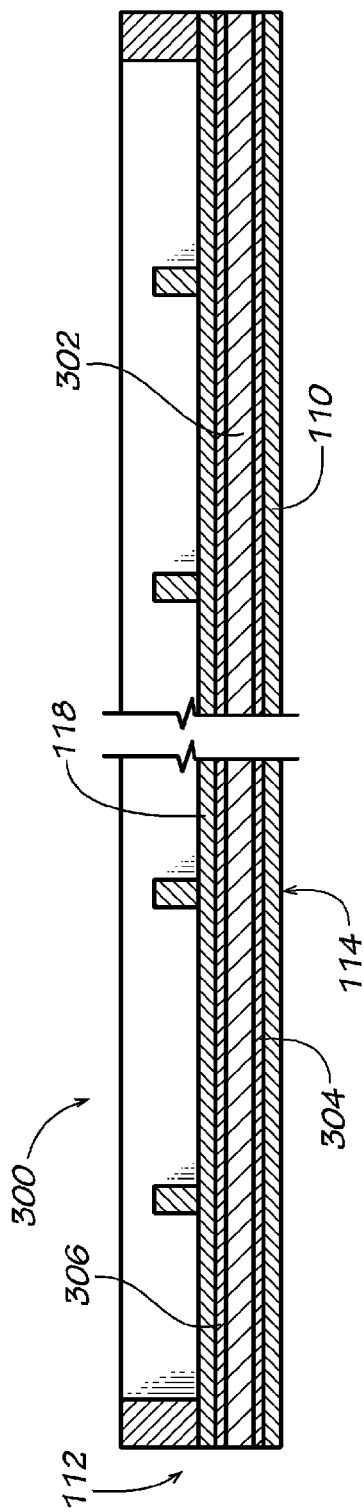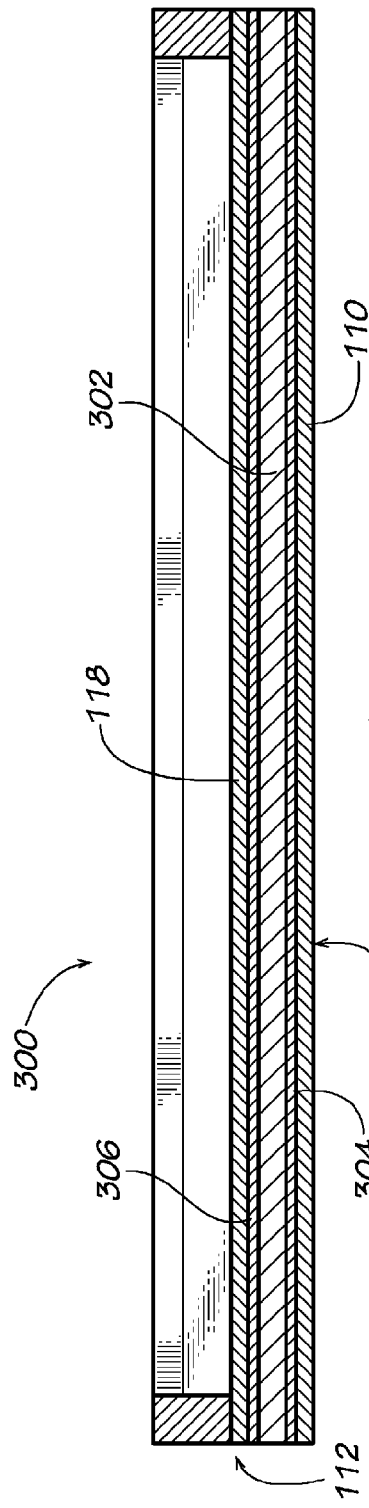
FIG. 9
FIG. 10

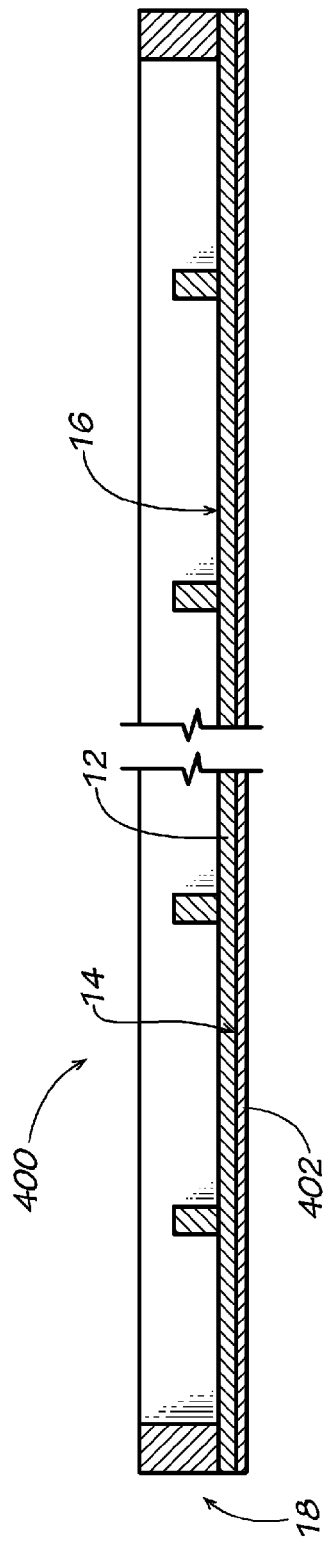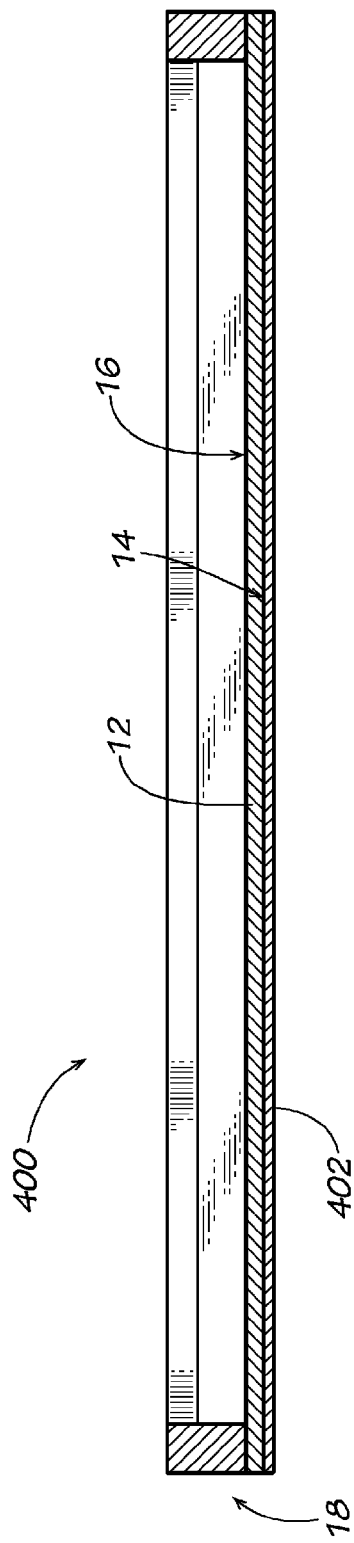

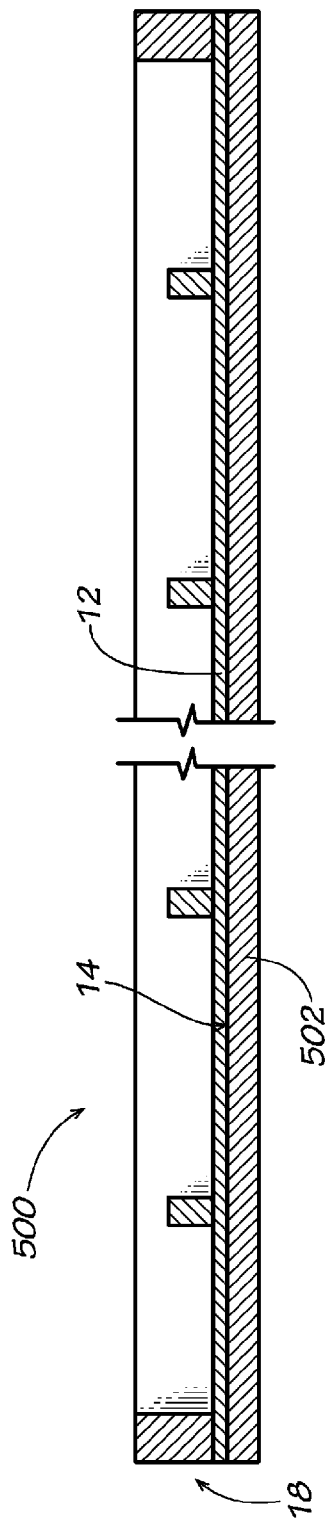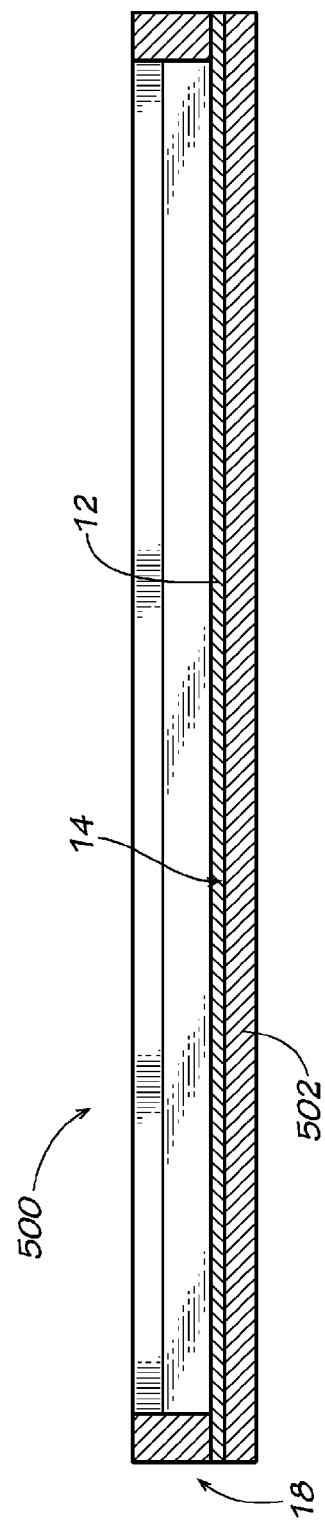

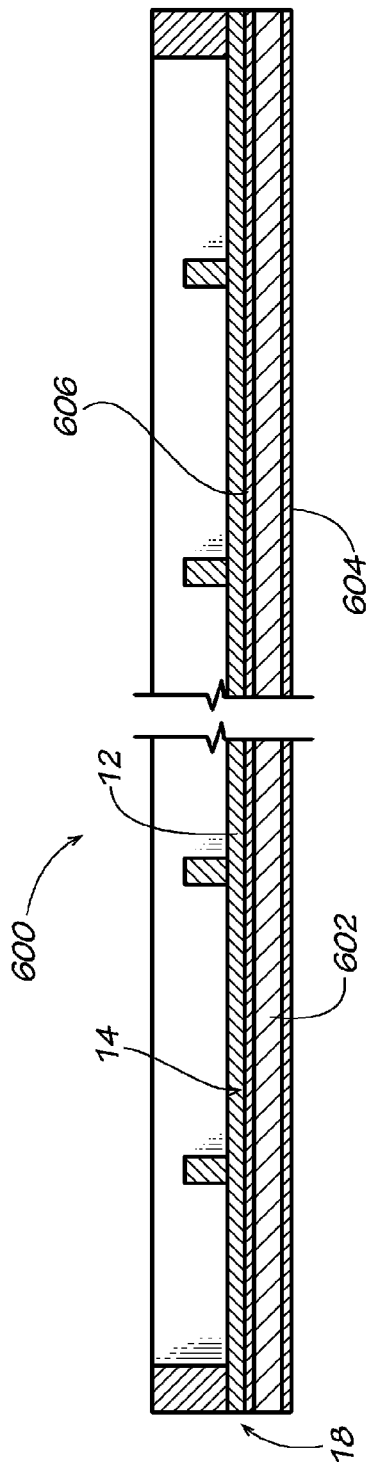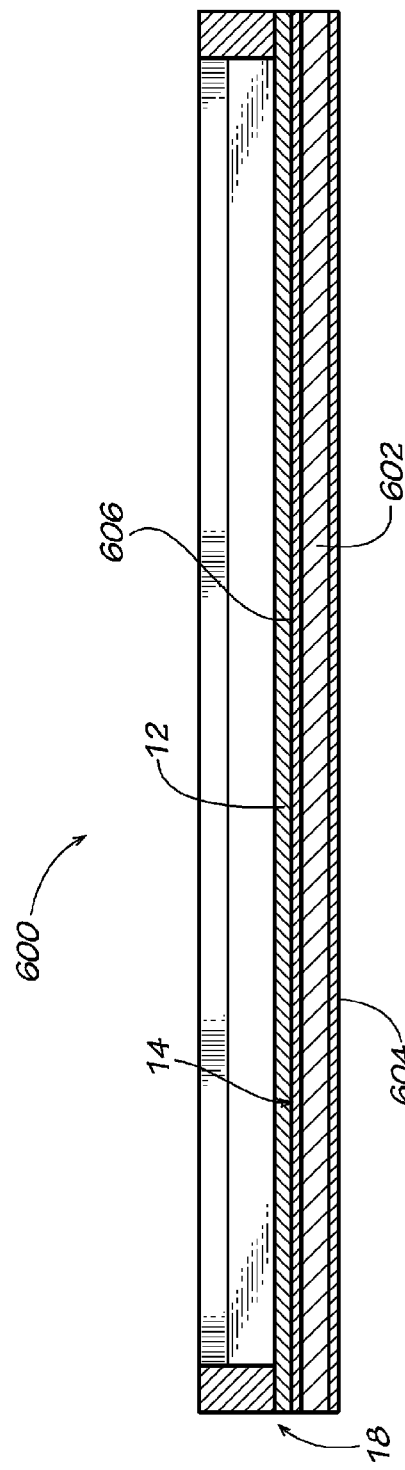

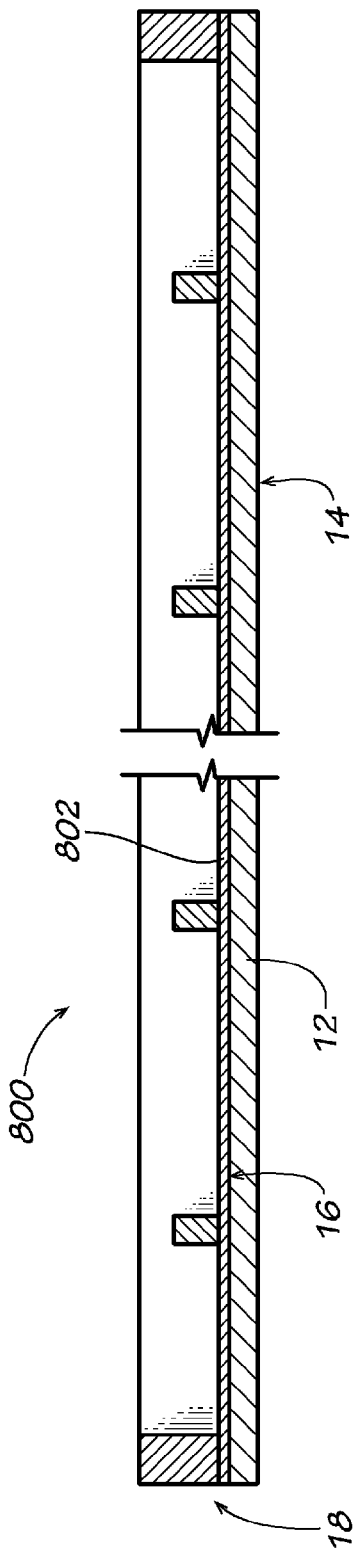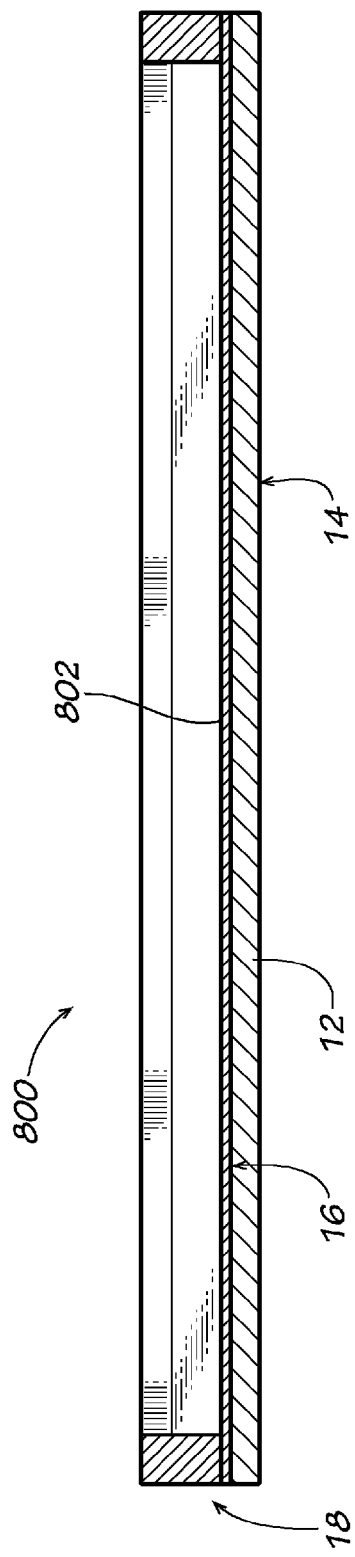

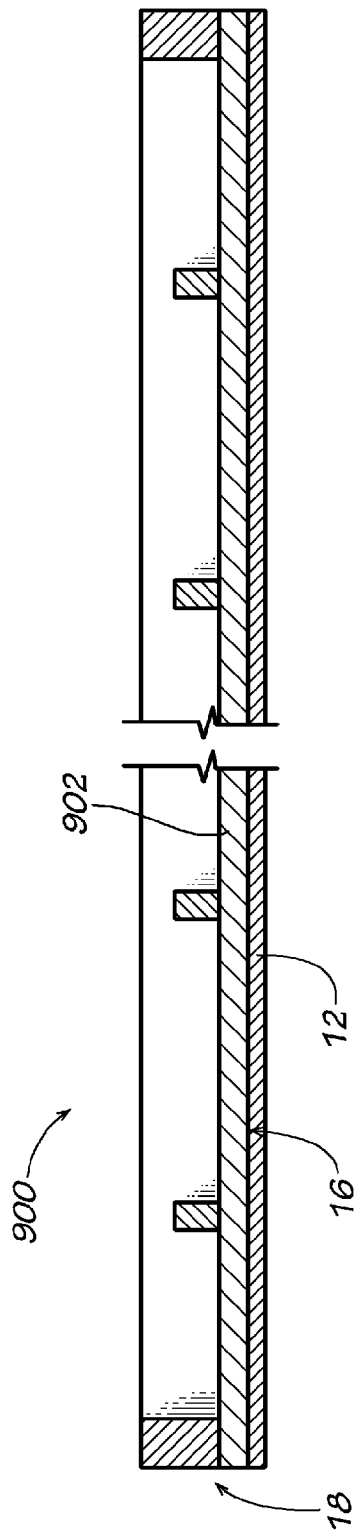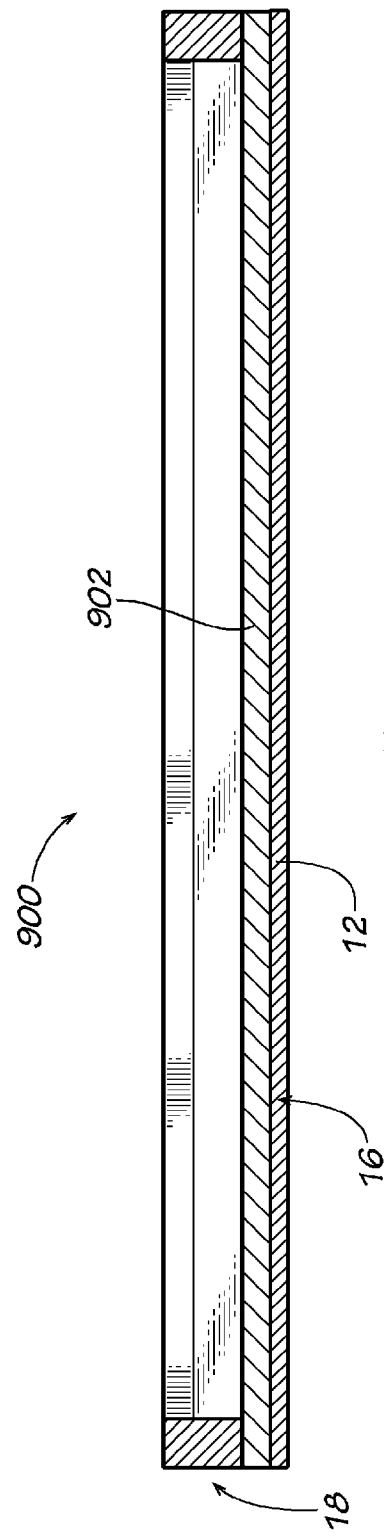

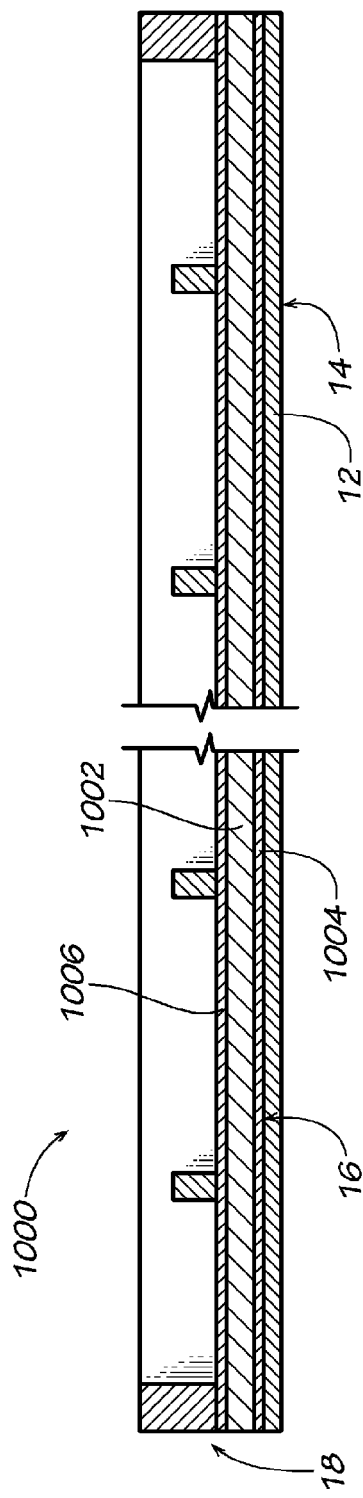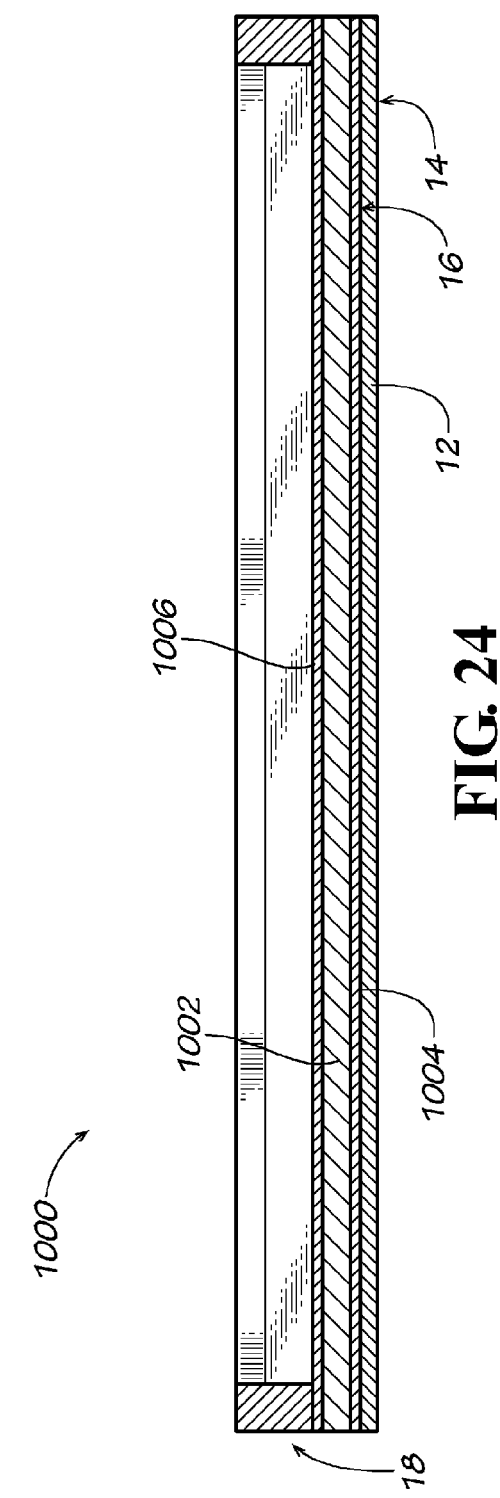

COMPOSITE INSULATED PLYWOOD, INSULATED PLYWOOD CONCRETE FORM AND METHOD OF CURING CONCRETE USING SAME

FIELD OF THE INVENTION

The present invention generally relates to a form for cement-based materials. More particularly, this invention relates to a concrete form, particularly an insulated concrete form. The present invention also relates to a method of curing concrete. The present invention also relates to a method for curing concrete using an insulated concrete form. The present invention also related to a method of curing concrete with reduced amounts of portland cement, which produces a concrete that cures faster and is stronger and more durable.

BACKGROUND OF THE INVENTION

Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Concrete typically is made from portland cement ("PC"), water and aggregate. Curing concrete requires two elements: suitable temperature and water. To achieve maximum strength, all cement particles must be hydrated. The initial process of hydration is exothermic; it generates a considerable amount of energy called "heat of hydration." Fluid (plastic) concrete is poured in various forms and molds. These prior art uninsulated forms are exposed to the environment, and, therefore, the energy from the heat of hydration is generally lost in the first 12-20 hrs. In the next few days, most of the free moisture is also lost from the concrete. Therefore, the two elements required to fully hydrate the cement are lost during the initial stage of concrete curing. Thus, the cement may never fully hydrate, and, therefore, may never achieve maximum strength. portland cement concrete achieves 90% of maximum strength under ideal curing conditions in about 28 days.

Portland cement manufacture causes environmental impacts at all stages of the process. During manufacture, a metric ton of $CO_2$ is released for every metric ton of portland cement made. Worldwide $CO_2$ emissions from portland cement manufacture amount to about 5-7% of total $CO_2$ emissions. The average energy input required to make one ton of portland cement is about 4.7 million Btu—the equivalent of about 418 pounds of coal. The production of portland cement is energy intensive, accounting for 2% of primary energy consumption globally. In 2010 the world production of hydraulic cement was 3,300 million tons.

Concrete can also be made with slag cement ("SC") and fly ash ("FA") but are not frequently used. Slag cement and fly ash generate relatively low amounts of heat of hydration, which result in extremely slow setting time and strength gain. Slag cement and fly ash can be mixed with portland cement but industry practice in building construction limits use of slag cement and fly ash to no more than 30% replacement of portland cement and only during warm weather conditions. Concrete made with slag cement and fly ash may take up to 90 days to achieve 80-90% of maximum strength. Mass concrete structures use more slag cement and fly ash, replacing up to 80% of portland cement, as a means to reduce the heat of hydration to reduce cracking Slag cement and fly ash use less water to hydrate, may have finer particles than portland cement and produce concretes that achieve higher compressive and flexural strength. Such concrete is also less permeable, and, therefore, structures built with slag cement and fly ash have far longer service lives.

Slag cement is obtained by quenching molten iron slag (a by-product of iron and steel-making) from a blast furnace in water or steam, to produce a glassy, granular product that is then dried and ground into a fine powder. Slag cement manufacture uses only 15% of the energy needed to make portland cement. Since slag cement is made from a waste materials; no virgin materials are required and the amount of landfill space otherwise used for disposal is reduced. For each metric ton of pig iron produced, approximately ⅓ metric ton of slag is produced. In 2009, worldwide pig iron production was 1.211 billion tons. There was an estimated 400 million tons of slag produced that could potentially be made into slag cement. However, only a relatively small percentage of slag is used to make slag cement in the USA.

Fly ash is a by-product of the combustion of pulverized coal in electric power generation plants. When pulverized coal is ignited in a combustion chamber, the carbon and volatile materials are burned off. However, some of the mineral impurities of clay, shale, feldspars, etc. are fused in suspension and carried out of the combustion chamber in the exhaust gases. As the exhaust gases cool, the fused materials solidify into spherical glassy particles called fly ash. The quantity of fly ash produced is growing along with the steady global increase in coal use. According to Obada Kayali, a civil engineer at the University of New South Wales Australian Defense Force Academy, only 9% of the 600 million tons of fly ash produced worldwide in 2000 was recycled and even smaller amount used in concrete; most of the rest is disposed of in landfills. Since fly ash is a waste product, no additional energy is required to make it.

Concrete walls, and other concrete structures and objects, traditionally are made by building a form or a mold. The forms and molds are usually made from wood, plywood, metal and other structural members. Unhardened (plastic) concrete is poured into the space defined by opposed spaced form members. Once the concrete hardens sufficiently, although not completely, the forms are removed leaving a concrete wall or other concrete structure, structural member or concrete object exposed to ambient temperatures. Concrete forms are typically made of various types of plywood or metal supported by a frame. These forms are not insulated which means that concrete is exposed to the elements during the initial portion of the curing process. This often makes the curing of the concrete a slow process and the ultimate strength difficult to control or predict. To compensate for these losses and increase the rates of setting and strength development, larger amounts of portland cement are used than otherwise would be necessary.

The curing of plastic concrete requires two elements, water and heat, to fully hydrate the cementitious material. The curing of plastic concrete is an exothermic process. This heat is produced by the hydration of the portland cement, or other pozzolanic or cementitious materials, that make up the concrete. Initially, the hydration process produces a relatively large amount of heat. Concrete placed in conventional forms (i.e., uninsulated forms) loses this heat of hydration to the environment in a very short time, generally in the first 8-24 hours, depending on the ambient temperature. Also, concrete placed in conventional forms does not reach its maximum potential temperature. As the hydration process proceeds, relatively less heat of hydration is generated due to slowing reaction rates. At the same time, moisture in the concrete is lost to the environment. If one monitors the temperature of concrete during the curing process, it produces a relatively large increase in temperature which then decreases relatively rapidly over time. This chemical reaction is temperature dependent. That is, the hydration process, and consequently the strength gain, proceeds faster at higher temperature and slower at lower temperature. In conventional forms, both heat and moisture are lost in a relatively short time, which makes it difficult, or impossible, for the cementitious material to fully hydrate, and, therefore, the concrete may not achieve its maximum potential strength.

Concrete in conventional concrete forms or molds is typically exposed to the elements. Conventional forms or molds provide little insulation to the concrete contained therein. Therefore, heat produced within the concrete form or mold due to the hydration process usually is lost through a conventional concrete form or mold relatively quickly. Thus, the temperature of the plastic concrete may initially rise 20 to 40° C., or more, above ambient temperature due to the initial hydration process and then fall relatively quickly to ambient temperature, such as within 8 to 36 hours depending on the climate and season and size of the concrete element. This initial relatively large temperature drop may result in significant concrete shrinkage and/or thermal effects which can lead to concrete cracking. The remainder of the curing process is then conducted at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40° F.; below 40° F., the hydration process slows and at some point may stop altogether. Under conventional forming and curing methods, the concrete takes a relatively long time to fully hydrate the cementitious materials. Since both the initial heat and moisture are quickly lost in conventional forms, it is typically recommended that concrete by moisture cured for 28 days to fully hydrate the concrete. However, moisture curing for 28 days is seldom possible to administer in commercial practice. Therefore, concrete poured in various applications in conventional forms seldom develops it maximum potential strength and durability.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference in their entirety) are exemplary of prior art modular insulated concrete form systems. Full-height insulated concrete forms are also known in the prior art. U.S. Patent Application Publication No. 2011/0239566 (the disclosure of which is incorporated herein by reference in its entirety) discloses a full-height insulated concrete form.

Although insulated concrete forms work well and provide many benefits, concrete contractors and architects are somewhat reluctant to use them or specify them. Under conventional forming and curing methods the concrete takes a relatively long time to fully hydrate the cementitious materials. Since both the initial heat and moisture is often relatively quickly lost, it is typically recommended that concrete be moist cured for 28 days to fully hydrate the cement. However, moisture curing for 28 days is seldom possible to achieve in commercial practice. Therefore, for concrete poured for various applications it can be very difficult, or impossible, to achieve its maximum potential strength and durability. Current insulated concrete forms are made of polymeric foam and remain in place after concrete is placed. However, there are many types of applications that do not need the insulation provided by insulated concrete forms to remain in place as part of the structure.

It is believed that concrete forms have not been proposed or used as a method to cure concrete or to improve the performance and properties of concrete. The present invention has discovered that when retaining in an insulated concrete form the initial heat generated by the hydration of cementitious material, the concrete achieves a greater internal temperature and such temperature is sustained for much longer periods of time before it is lost to the environment. During this time, there is sufficient moisture in the concrete to hydrate the cementitious material.

Many concrete contractors prefer to use the prior art plywood-type concrete form because it is the form with which they and the construction workforce are familiar. Therefore, it would be desirable to produce a concrete form that combines the benefits of an insulated concrete form with a conventional concrete form that can retain the initial heat of hydration to accelerate the hydration process and more fully cure concrete immediately after concrete is placed in the forms. Any type of concrete placed in such forms will have far improved properties and be more durable and longer lasting. It is also desirable to make concrete from as much post industrial waste as possible thereby reducing the burden on landfill. It would also be desirable to reduce the amount of portland cement used in concrete as much as possible to thereby reduce the amount of $CO_2$ emissions associated with manufacture of portland cement.

SUMMARY OF THE INVENTION

The present invention satisfies the foregoing needs by providing an improved concrete forming system to retain the heat of hydration of curing concrete.

In one disclosed embodiment, the present invention comprises a concrete form. The form comprises a first panel having a first primary surface for contacting plastic concrete and a second primary surface opposite the first surface and a layer of insulating material on the second primary surface.

In another disclosed embodiment, the present invention comprises a concrete form. The form comprises a first panel having a first primary surface for contacting plastic concrete and a second primary surface opposite the first surface and a second panel having a first primary surface and a second primary surface opposite the first surface, the second panel being attached to the first panel so that the first primary surface of the second panel is adjacent the second primary surface of the first panel. The form also comprises a layer of radiant heat reflective material and a layer of insulating material disposed between and covering the second primary surface of the first panel and first primary surface of the second panel.

In another disclosed embodiment, the present invention comprises a concrete form. The form comprises a plywood panel having a first surface for contacting plastic concrete and a second surface opposite the first surface, a frame attached to the panel and a layer of radiant heat reflective material disposed on the first surface.

In another disclosed embodiment, the present invention comprises a concrete form. The form comprises a plywood panel having a first surface for contacting plastic concrete and a second surface opposite the first surface, a frame attached to the panel and a layer of radiant heat reflective material disposed on the second surface.

In another disclosed embodiment, the present invention comprises a concrete form. The form comprises a panel for contacting plastic concrete the panel comprising a laminate of at least a first sheet of plywood and a second sheet of plywood; a frame attached to the panel and a layer of aluminum foil disposed between the first and second sheets of plywood.

In another disclosed embodiment, the present invention comprises a concrete form. The form comprises a panel for contacting plastic concrete, the panel comprising a laminate of at least a first layer of plywood or wood, a second layer of plywood or wood and a layer of insulating material or radiant heat reflective material, or both, disposed between the first and second layers.

In another disclosed embodiment, the present invention comprises a concrete form. The form comprises a panel for contacting plastic concrete, the panel having a primary surface and a layer of radiant heat reflective material disposed on and covering the primary surface.

In another disclosed embodiment, the present invention comprises a concrete form. The form comprises a panel for contacting plastic concrete, the panel having a primary surface and a layer of insulating material disposed on and covering the primary surface.

In another disclosed embodiment, the present invention comprises a concrete form. The form comprises a panel for contacting plastic concrete, the panel having a primary surface and a layer of insulating material and a layer of radiant heat reflective material disposed on and covering the primary surface.

In another disclosed embodiment, the present invention comprises a method of forming concrete. The method comprises placing plastic concrete between a pair of opposed concrete forms. Each of the concrete forms comprises a plywood panel having a first primary surface for contacting plastic concrete and a second primary surface opposite the first surface and a layer of insulating material on the second primary surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a first panel having a first primary surface for contacting plastic concrete and a second primary surface opposite the first surface, a second panel having a first primary surface and a second primary surface opposite the first surface, the second panel being attached to the first panel so that the first primary surface of the second panel is adjacent the second primary surface of the first panel and a layer of radiant heat reflective material and a layer of insulating material disposed between and covering the second primary surface of the first panel and first primary surface of the second panel. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a plywood panel having a first surface for contacting plastic concrete and a second surface opposite the first surface, a frame attached to the panel and a layer of radiant heat reflective material disposed on the first surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a plywood panel having a first surface for contacting plastic concrete and a second surface opposite the first surface, a frame attached to the panel and a layer of radiant heat reflective material disposed on the second surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete the panel comprising a laminate of at least a first sheet of plywood and a second sheet of plywood, a frame attached to the panel and a layer of aluminum foil disposed between the first and second sheets of plywood. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete the panel comprising a laminate of at least a first sheet of plywood and a second sheet of plywood, a frame attached to the panel and a layer of aluminum foil disposed between the first and second sheets of plywood. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprising a panel for contacting plastic concrete, the panel having a primary surface and a layer of radiant heat reflective material disposed on and covering the primary surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete, the panel having a primary surface and a layer of insulating material disposed on and covering the primary surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete, the panel having a primary surface and a layer of insulating material and a layer of radiant heat reflective material disposed on and covering the primary surface. The method further comprises leaving the concrete forms in place for a time sufficient to at least partially cure the plastic concrete.

Therefore, it is an object of the present invention to provide an improved insulated concrete form.

Another object of the present invention is to provide an insulated concrete form that can be used in the same manner as prior art plywood-type concrete forms.

A further object of the present invention is to provide a method of curing concrete by retaining the heat of hydration within the concrete thereby accelerating the hydration of cementitious materials to achieve concrete with improved properties.

Another object of the present invention is to provide an improved method for curing concrete by fully hydrating the cementitious material before needed heat and moisture are lost to the environment.

Another object of the present invention is to provide a system for curing concrete such that the concrete develops its maximum strength as early as possible.

A further object of the present invention is to provide a concrete curing system that uses reduced amounts of portland cement while producing concrete having an ultimate strength equivalent to concrete made with conventional amounts of portland cement.

Another object of the present invention is to provide a concrete curing system that eliminates the use of portland cement while producing concrete having an ultimate strength equivalent to concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, while producing concrete having an ultimate strength equivalent to, or better than, concrete made with conventional amounts of portland cement.

A further object of the present invention is to provide a concrete curing system that uses inert or filler material, such as ground limestone, calcium carbonate, titanium dioxide, or quartz, while producing concrete having an ultimate strength equivalent to, or better than, concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that concrete mixes containing reduced amounts of portland cement can be cured efficiently and effectively therein while having compressive strengths equivalent to, or better than, conventional concrete mixes.

Yet another object of the present invention is to provide a system for curing concrete such that the concrete develops its maximum durability.

Another object of the present invention is to provide a system for curing concrete more quickly.

Another object of the present invention is to provide an improved concrete form.

Another object of the present invention is to provide an insulated concrete form that provides insulation for both radiant heat loss and conductive heat loss.

These and other objects, features and advantages of the present invention will become apparent after a review of the following detailed description of the disclosed embodiments and the appended drawing and claims.

BRIEF DESCRIPTION OF THE DRAWINGS

FIG. 5 is a partially broken away cross-sectional view taken along the line 5-5 of the insulated concrete form shown in FIG. 4.

FIG. 6 is a cross-sectional view taken along the line 6-6 of the insulated concrete form shown in FIG. 4.

FIG. 9 is a partially broken away cross-sectional view taken along the line 5-5 of another alternative disclosed embodiment of the insulated concrete form shown in FIG. 4.

FIG. 10 is a cross-sectional view taken along the line 6-6 of another alternative disclosed embodiment of the insulated concrete form shown in FIG. 4.

FIG. 12 is a partially broken away cross-sectional view taken along the line 12-12 of the insulated concrete form shown in FIG. 11.

FIG. 13 is a cross-sectional view taken along the line 13-13 of the insulated concrete form shown in FIG. 11.

FIG. 14 is a partially broken away cross-sectional view taken along the line 12-12 of an alternative disclosed embodiment of the insulated concrete form shown in FIG. 11.

FIG. 15 is a cross-sectional view taken along the line 13-13 of an alternative disclosed embodiment of the insulated concrete form shown in FIG. 11.

FIG. 16 is a partially broken away cross-sectional view taken along the line 12-12 of another alternative disclosed embodiment of the insulated concrete form shown in FIG. 11.

FIG. 17 is a cross-sectional view taken along the line 13-13 of another alternative disclosed embodiment of the insulated concrete form shown in FIG. 11.

FIG. 19 is a partially broken away cross-sectional view taken along the line 19-19 of the insulated concrete form shown in FIG. 18.

FIG. 20 is a cross-sectional view taken along the line 20-20 of the insulated concrete form shown in FIG. 18.

FIG. 21 is a partially broken away cross-sectional view taken along the line 19-19 of an alternative disclosed embodiment of the insulated concrete form shown in FIG. 18.

FIG. 22 is a cross-sectional view taken along the line 20-20 of an alternative disclosed embodiment of the insulated concrete form shown in FIG. 18.

FIG. 23 is partially broken away a cross-sectional view taken along the line 19-19 of another alternative disclosed embodiment of the insulated concrete form shown in FIG. 18.

FIG. 24 is a cross-sectional view taken along the line 20-20 of another alternative disclosed embodiment of the insulated concrete form shown in FIG. 18.

DETAILED DESCRIPTION OF THE DISCLOSED EMBODIMENTS

Figure 1:
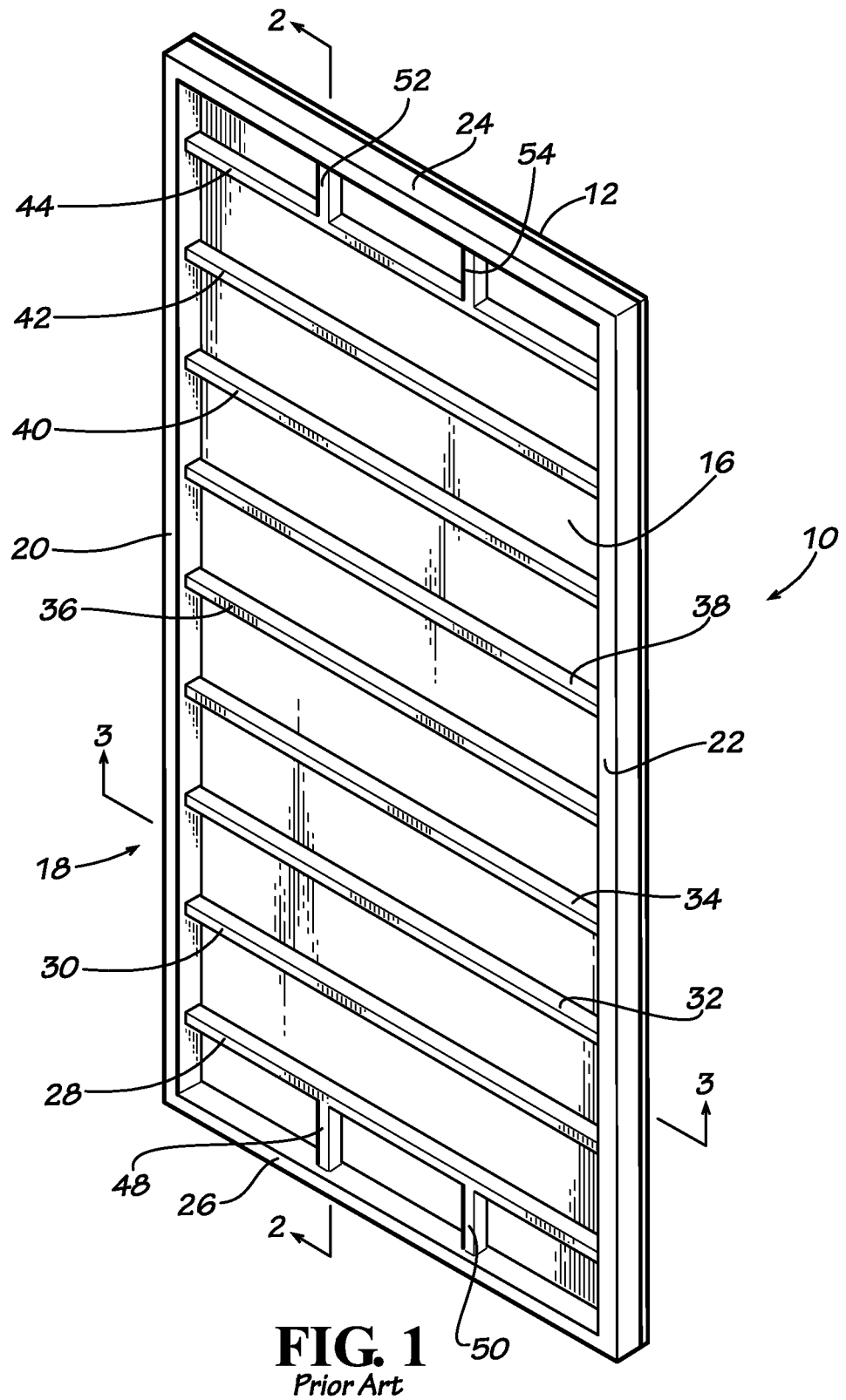
FIG. 1 is a partially broken away perspective view of a typical prior art concrete form having a plywood panel and steel frame construction.
Figure 2:
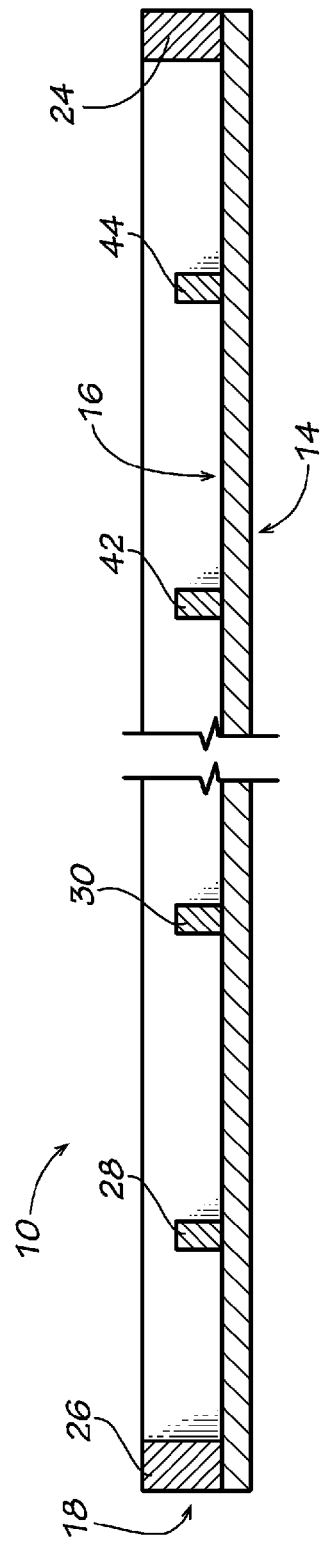
FIG. 2 is a partially broken away cross-sectional view taken along the line 2-2 of the prior art concrete form shown in FIG. 1.
Figure 3:
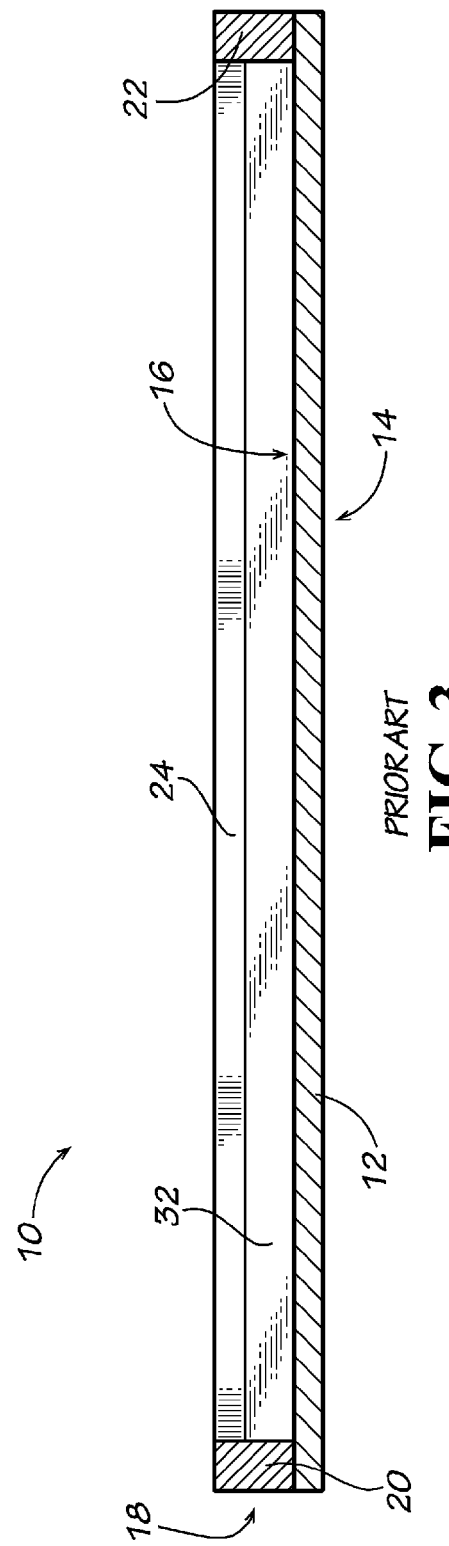
FIG. 3 is a cross-sectional view taken along the line 3-3 of the prior art concrete form shown in FIG. 1.

Referring now to the drawing in which like numbers indicate like elements throughout the several views, there is shown in FIG. 1 a typical prior art concrete form 10. The concrete form 10 comprises a rectangular concrete forming face panel 12 made of a wood material typically used in prior art concrete forms. Most prior art concrete forms use wood, plywood, wood composite materials, or wood or composite materials with polymer coatings for the concrete forming panel of their concrete forms. A preferred prior art material for the face panel 12 is a sheet of high density overlay (HDO) plywood. The prior art face panel 12 can be any useful thickness depending on the anticipated load the form will be subjected to. However, thicknesses of 0.5 inches to ⅞ inches are typically used. The panel 12 has a first primary surface 14 for contacting plastic concrete and an opposite second primary surface 16. The first surface 14 is usually smooth and flat. However, the first surface 14 can also be contoured so as to form a desired design in the concrete, such as a brick or stone pattern. The first surface 14 can also include a polymer coating to make the surface smoother, more durable and/or provide better release properties.

Attached to the second surface 16 of the panel 12 is a rectangular frame 18, which comprises two elongate longitudinal members 20, 22 and two elongate transverse members 24, 26. The longitudinal members 20, 22 and the transverse members 24, 26 are attached to each other and to the face panel 12 by any suitable means used in the prior art. The frame 18 also comprises at least one, and preferably a plurality, of transverse bracing members 28, 30, 32, 34, 36, 36, 40, 42, 44. The transverse bracing members 28-44 are attached to the longitudinal members 20, 22 and to the panel 12 by any suitable means used in the prior art. The frame 18 also includes bracing members 48, 50 and 52, 54. The bracing members 48, 50 extend between the transverse member 26 and the bracing member 28. The bracing members 48, 50 are attached to the transverse member 26 and the bracing member 28 and to the panel 12 by any suitable means used in the prior art. The bracing members 52, 54 extend between the transverse member 24 and the bracing member 44. The bracing members 52, 54 are attached to the transverse member 24 and the bracing member 44 and to the panel 12 by any suitable means used in the prior art. The frame 18 helps prevent the panel 12 from flexing or deforming under the hydrostatic pressure of the plastic concrete when place between opposed forms. The frame 18 can be made from any suitable material, such as wood or metal, such as aluminum or steel, depending on the load to which the form will be subjected. The particular design of the frame 18 is not critical to the present invention. There are many different designs of frames for concrete forms and they are all applicable to the present invention.

Figure 4:
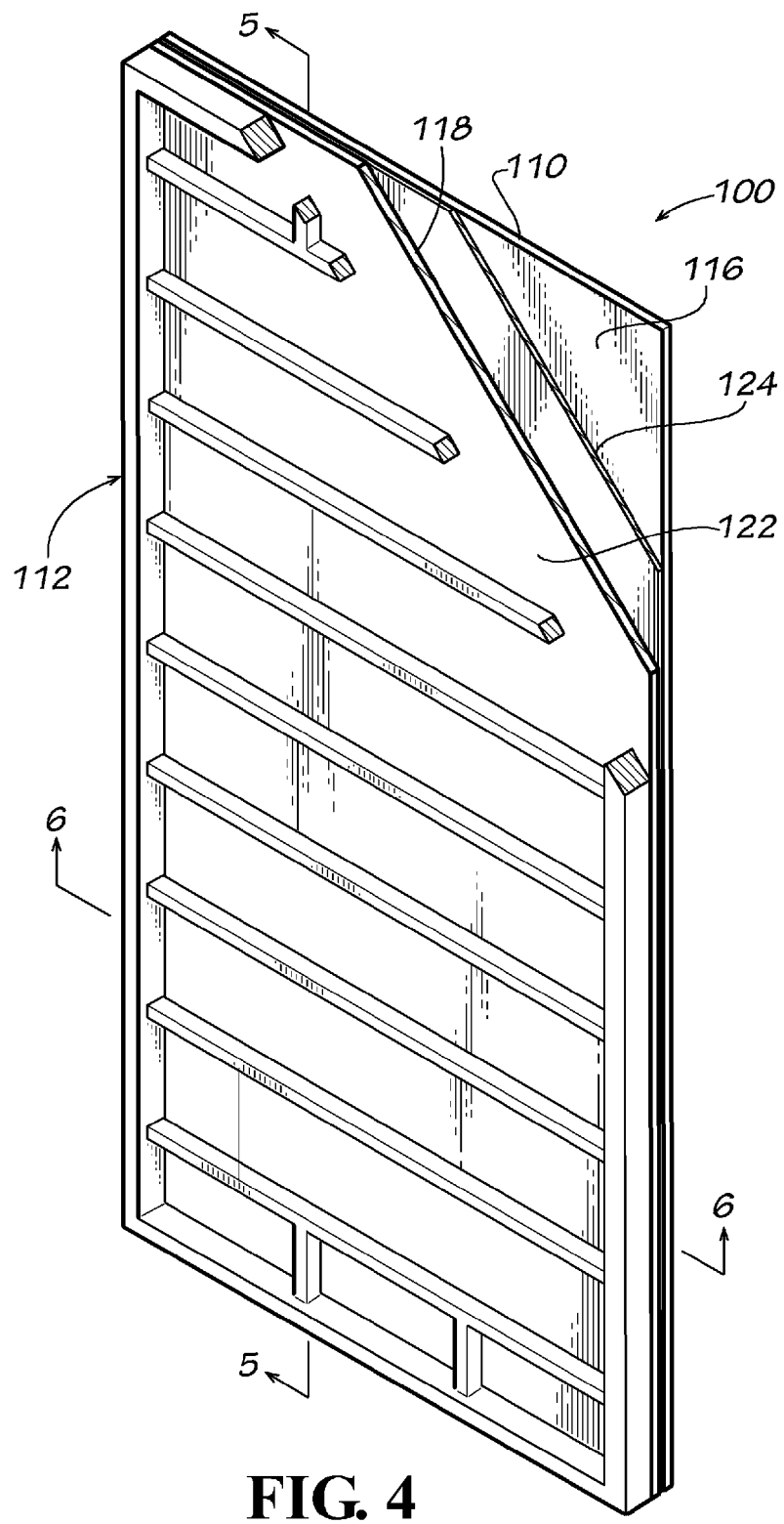
FIG. 4 is a partially broken away perspective view of a disclosed embodiment of an insulated concrete form in accordance with the present invention.

The present invention departs from conventional prior art plywood-type concrete forms, such as the form 10, as explained below. With reference to FIGS. 4-6 there is shown an insulated concrete form 100 in accordance with the present invention. The concrete form 100 comprises a face or first panel 110 and a frame 112. The first panel 110 and frame 112 can be identical to the prior art face panel 12 and frame 18, as described above, and therefore will not be described in any more detail here. The first panel 110 has a first primary surface 114 for contacting plastic concrete and an opposite second primary surface 116. The insulated concrete form 100 also comprises a second panel 118 identical, or substantially identical, to the first panel 110. The second panel 118 has a first primary surface 120 and an opposite second primary surface 122. The first primary surface 120 of the second panel 118 is adjacent the second primary surface 116 of the first panel 110. Disposed between the first and second panels 110, 118 is a layer of radiant heat reflective material 124. The layer of radiant heat reflective material 124 covers, or substantially covers, the second primary surface 116 of the first panel 110 and the first primary surface 120 of the second panel 118. As used herein the term "substantially covers" means covering at least 80% of the surface area. The layer of radiant heat reflective material 124 can be made from any suitable material that reflects radiant heat, such as metal foil, especially aluminum foil, or a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA.

Although refractory insulating material has properties of conductive heat insulating properties, it also has properties of radiant heat reflective properties. Therefore, for the insulated concrete form 100, the layer of radiant heat reflective material 124 can also be made from a refractory insulating material, such as a refractory blanket, a refractory board or a refractory felt or paper. Refractory insulating material is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, or epoxy, and used as a coating to create a refractory insulating material layer, for example covering, or substantially covering, one of the primary surfaces 116, 120 of the first or second panels 110, 118, or both. Ceramic fibers in a polymer binder are commercially available as Super Therm®, Epoxotherm and HPC Coating from Superior Products, II, Inc., Weston, Fla., USA.

The layer of radiant heat reflective material 124 can be adhesively attached to the first panel 110 or to the second panel 118, or to both panels. Alternatively, the layer of radiant heat reflective material 124 can be held in place between the first and second panels 110, 118 by the compressive force of the two panels being held together by a mechanical fastener, such as a screw or bolt penetrating through the second panel into the first panel. The sandwich panel formed by the first panel 110, the layer of radiant heat reflective material 124, and the second panel 118 can be attached to the frame 112 by an suitable means, such as a mechanical connector, for example a screw or bolt penetrating the frame, the second panel, the layer of radiant heat reflective material and into the first panel.

Use of the insulated concrete form 100 will now be considered. The insulated concrete form 100 can be used in the same way as a conventional prior art plywood-type form, such as the concrete form 10. Two identical insulated concrete forms 100 are placed vertically and horizontally spaced from each other, in a manner well known in the art. Typically, multiple forms are attached to each other linearly to form, for example a wall of a desired length and configuration. Then, plastic concrete is placed in the spaced defined by the two opposed insulated concrete forms 100. The insulated concrete forms 100 are left in place for a time sufficient for the plastic concrete within the form to at least partially cure. While the insulated concrete forms 100 are in place, the layer of radiant heat reflective material 124 reduces the amount of heat of hydration lost from the curing concrete by reflecting at least some of the radiant heat therefrom back into the concrete. By retaining a portion of the heat of hydration, the plastic concrete in the insulated concrete form 100 cures more quickly and achieve better physical properties than it would have had it been cured in a conventional plywood-type concrete form, such as the concrete form 10. This is true for conventional portland cement concrete, but is even more so for concrete including slag cement and/or fly ash, as described below. Furthermore, it is desirable to leave the insulated concrete forms 100 in place with the curing concrete there between for a period of 1 to 28 days, preferably 1 to 14 days, more preferably 2 to 14 days, especially 5 to 14 days, more especially 1 to 7 days, most especially 1 to 3 days. After the concrete has cured to a desired degree, the insulated concrete forms 100 can be stripped from the concrete in a conventional manner known in the art.

The insulated concrete form 100 of the present invention is advantageous over the prior art because it can be used in the same manner as a prior art plywood-type concrete form. Therefore, there is no new training required to install or remove these forms. However, the insulated concrete form 100 produces cured concrete more quickly and concrete having improved physical properties without adding expensive chemical additives and without adding energy to the curing concrete. The insulated concrete form 100 also provides the option of reducing the amount of portland cement in the concrete mix, and, therefore, reducing the cost thereof and improving concrete performance.

Figure 7:
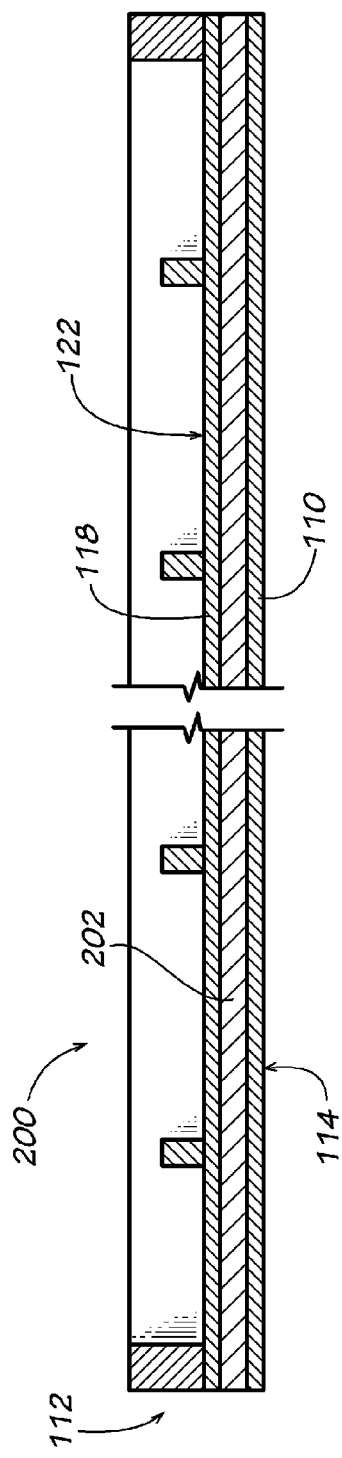
FIG. 7 is a partially broken away cross-sectional view taken along the line 5-5 of an alternative disclosed embodiment of the insulated concrete form shown in FIG. 4.
Figure 8:
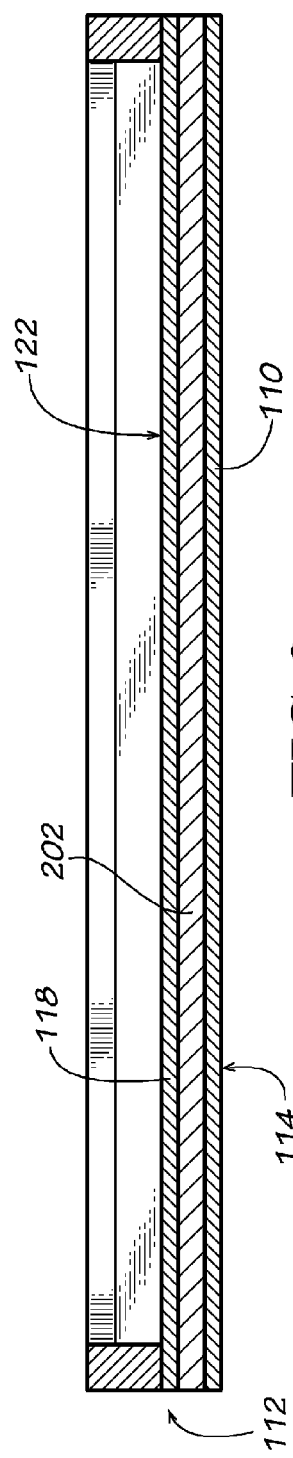
FIG. 8 is a cross-sectional view taken along the line 6-6 of an alternative disclosed embodiment of the insulated concrete form shown in FIG. 4.

With reference to FIGS. 7 and 8, there is shown an alternate disclosed embodiment of an insulated concrete form 200 in accordance with the present invention. The insulated concrete form 200 is identical to the insulated concrete form 100, except a layer of insulating material 202 is substituted for the layer of radiant heat reflective material 124. Thus, in the insulated concrete form 200, the layer of insulating material 202 is sandwiched between the first panel 110 and the second panel 118. Furthermore, the layer of insulating material 202 covers, or substantially covers, the primary surfaces 116, 120 of the first and second panels 110, 118.

For the insulated concrete form 200, the layer of insulating material 202 is made from any suitable material providing conductive heat insulating properties, preferably a sheet of closed cell polymeric foam, preferably a sheet of rigid closed cell polymeric foam. The layer of insulating material 202 is preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layer of insulating material 202 preferably has insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layer of insulating material 202 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layer of insulating material 202 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 202 should have an R-value of greater than 1.5, preferably greater than 4, more preferably greater than 8, most preferably greater than 9, especially greater than 12, most especially greater than 20. The layer of insulating material 202 preferably has an R-value of approximately 1.5 to approximately 40; more preferably between approximately 4 to approximately 40; especially approximately 8 to approximately 40; more especially approximately 12 to approximately 40. The layer of insulating material 344 preferably has an R-value of approximately 1.5, more preferably approximately 4, most preferably approximately 8, especially approximately 20, more especially approximately 30, most especially approximately 40.

For the insulated concrete form 200, the layer of insulating material 202 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating to create a refractory insulating material layer, for example covering, or substantially covering, one of the primary surfaces 116, 120 of the first or second panels 110, 118, or both. Such a refractory insulating material layer can be used as the layer of insulating material 202 to block excessive ambient heat loads and retain the heat of hydration within the insulated concrete forms of the present invention. Ceramic fibers in a polymer binder are commercially available as Super Therm®, Epoxotherm and HPC Coating from Superior Products, II, Inc., Weston, Fla., USA.

The layer of insulating material 202 is preferably a multi-layer material with a first layer of refractory insulating material and a second layer of polymeric foam insulating material. The layer of insulating material 202 more preferably comprises a layer of refractory insulating felt or board and a layer of expanded polystyrene foam.

The insulated concrete form 200 is used in the same manner as the insulated concrete form 100, described above.

With reference to FIGS. 9 and 10, there is shown an alternate disclosed embodiment of an insulated concrete form 300 in accordance with the present invention. The insulated concrete form 300 is identical to the insulated concrete form 100, except both a layer of insulating material 302 and one or more layers of radiant heat reflecting material 304, 306 are substituted for the single layer of radiant heat reflective material 124, as used in the insulated concrete form 100. The layer of insulating material 302 is identical to the layer of insulating material 202, as described above. Similarly, the layers of radiant heat reflecting material 304, 306 are each identical to the layer of radiant heat reflective material 124, as described above. In the insulated concrete form 300, the layer of radiant heat reflective material 304 is positioned between the first panel 110 and the layer of insulating material 302; the layer of radiant heat reflective material 306 is positioned between the second panel 118 and the layer of insulating material 302. Thus, in the insulated concrete form 300, the layer of insulating material 302 and the layers of radiant heat reflecting material 304, 306 are sandwiched between the first panel 110 and the second panel 118. Furthermore, the layer of insulating material 302 and the layers of radiant heat reflecting material 304, 306 cover, or substantially cover, the primary surfaces 116, 120 of the first and second panels 110, 118. In the insulated concrete form 300, the layer of radiant heat reflecting material 304 can be used with the layer of insulating material 302 or the layer of radiant heat reflecting material 306 can be used in conjunction with the layer of insulating material 302. However, it is preferably that both layers of radiant heat reflecting material 304, 306 be used in conjunction with the layer of insulating material 302, as shown in FIGS. 9 and 10. A preferred material for the layer of insulating material 302 and both layers of radiant heat reflecting material 304, 306 is a layer of insulating polymeric foam, as described above, having either a layer of aluminum foil attached to one or both of the opposed primary surfaces of the insulating polymeric foam or a layer of aluminized polymeric film attached to one or both of the opposed primary surfaces of the insulating polymeric foam. Such a material comprising a layer of closed cell polymeric foam (such as high density polyethylene foam) disposed between one layer of polyethylene film and one layer of reflective foil is commercially available as Space Age® reflective insulation from Insulation Solutions, Inc., East Peoria, Ill. 61611. Another preferred material for the layer of insulating material 302 and both layers of radiant heat reflecting material 304, 306 is a layer of refractory insulating material, as described above, having either a layer of aluminum foil attached to one or both of the opposed primary surfaces of the layer of refractory insulating material or a layer of aluminized polymeric film attached to one or both of the opposed primary surfaces of the layer of refractory insulating material. A preferred material for use as the layer of refractory insulating material is a foam, blanket, board, felt, paper or coating of Wollastonite.

The insulated concrete form 300 is used in the same manner as the insulated concrete form 100, described above.

Figure 11:
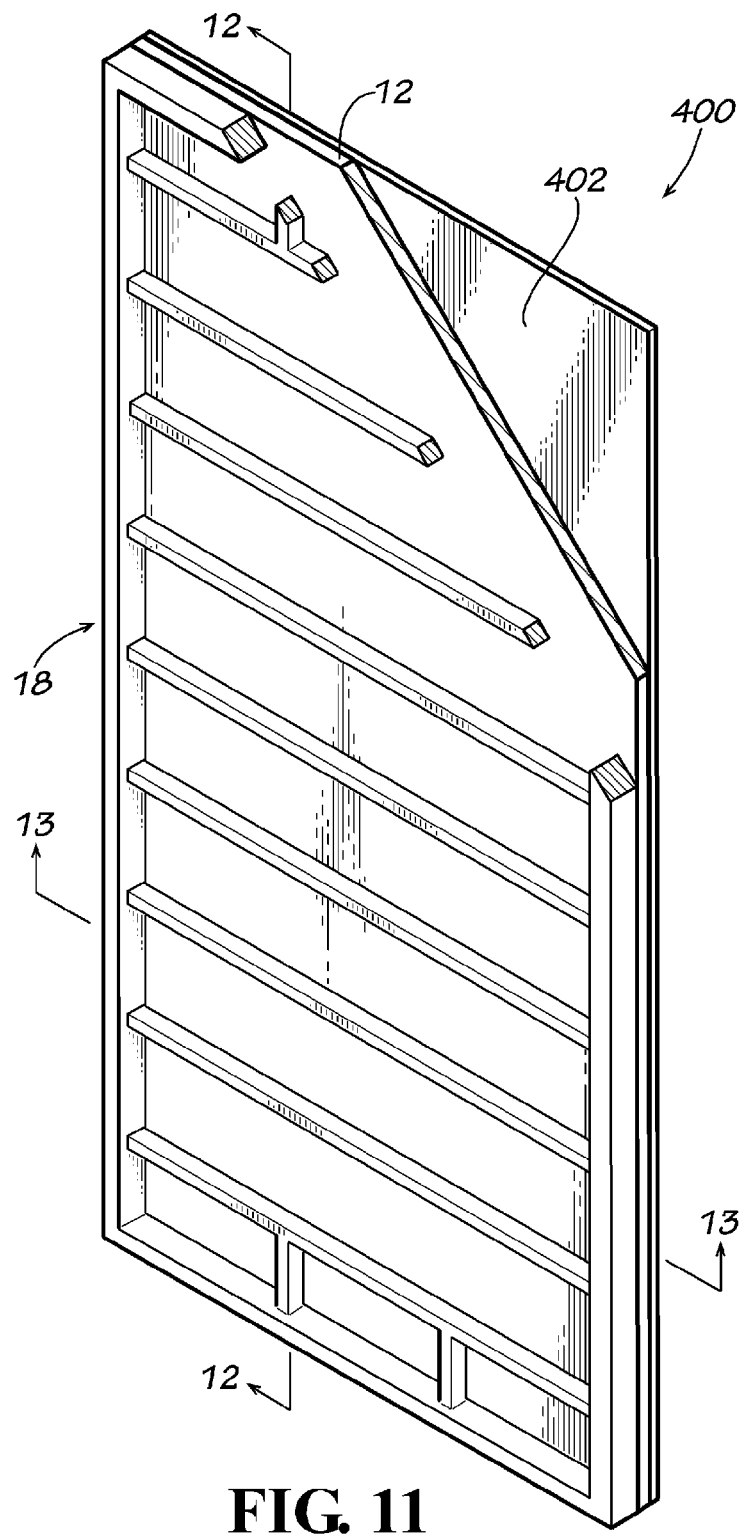
FIG. 11 is a partially broken away perspective view of another disclosed embodiment of an insulated concrete form in accordance with the present invention.

With reference to FIGS. 11-13, there is shown an alternate disclosed embodiment of an insulated concrete form 400 in accordance with the present invention. The insulated concrete form 400 is identical to the concrete form 10, except a layer of radiant heat reflecting material 402 is attached to the first primary surface 14 of the face panel 12. The layer of radiant heat reflecting material 402 is identical to the layer of radiant heat reflecting material 124, as described above. The layer of radiant heat reflecting material 402 covers, or substantially covers, the first primary surface 14 of the face panel 12. The layer of radiant heat reflecting material 402 is attached to the first primary surface 14 of the face panel 12 with any suitable adhesive. It is preferred that the layer of radiant heat reflecting material 402 be attached to the first primary surface 14 of the face panel 12 and encapsulated within an adhesive material, such as an acrylic or epoxy adhesive. Encapsulating the layer of radiant heat reflecting material 402 within an adhesive material provides a release coating for concrete contacting the adhesive material. Of course, an additional release coating can be applied to the adhesive material. Concrete release coatings are well known in the art.

The insulated concrete form 400 is used in the same manner as the insulated concrete form 100, described above.

With reference to FIGS. 14-15, there is shown an alternate disclosed embodiment of an insulated concrete form 500 in accordance with the present invention. The insulated concrete form 500 is identical to the concrete form 400, except a layer of insulating material 502 is attached to the first primary surface 14 of the face panel 12, instead of the layer of radiant heat reflecting material 402. The layer of insulating material 502 is identical to the layer of insulating material 202, as described above. The layer of insulating material 502 covers, or substantially covers, the first primary surface 14 of the face panel 12. The layer of insulating material 502 is attached to the first primary surface 14 of the face panel 12 with any suitable adhesive. It is preferred that the layer of insulating material 502 be attached to the first primary surface 14 of the face panel 12 and encapsulated within an adhesive material, such as an acrylic or epoxy adhesive. Encapsulating the layer of insulating material 502 within an adhesive material provides a release coating for concrete contacting the adhesive material. Of course, additional release coatings can be applied to the adhesive material. Concrete release coatings are well known in the art.

The insulated concrete form 500 is used in the same manner as the insulated concrete form 100, described above.

With reference to FIGS. 16-17, there is shown an alternate disclosed embodiment of an insulated concrete form 600 in accordance with the present invention. The insulated concrete form 600 is identical to the insulated concrete form 400, except both a layer of insulating material 602 and one or more layers of radiant heat reflecting material 604, 606 are substituted for the single layer of radiant heat reflective material 124, as used in the insulated concrete form 400. It is preferred that both layers of radiant heat reflecting material 604, 606 be used. The layer of insulating material 602 is identical to the layer of insulating material 202, as described above. Similarly, the layers of radiant heat reflecting material 604, 606 are each identical to the layer of radiant heat reflective material 124, as described above. If the layer of radiant heat reflective material 606 is used, the layer of radiant heat reflective material 606 is attached to the first primary surface 14 of the face panel 12 with any suitable adhesive, such as with a contact adhesive, and the layer of insulating material 602 is attached to the layer of radiant heat reflecting material 606. If the layer of radiant heat reflective material 606 is not used, the layer of insulating material 602 is attached to the first primary surface 14 of the face panel 12 with any suitable adhesive, such as with a contact adhesive. If the layer of radiant heat reflective material 604 is used, it is attached to the layer of insulating material 602 with any suitable adhesive. The layer of insulating material 602 and the one or more layers of radiant heat reflecting material 604, 606 cover, or substantially cover, the first primary surface 14 of the face panel 12. It is preferred that the layer of insulating material 602 and the one or more layers of radiant heat reflecting material 604, 606 be attached to the first primary surface 14 of the face panel 12 and encapsulated within an adhesive material, such as an acrylic or epoxy adhesive. Encapsulating the layer of insulating material 602 and the one or more layers of radiant heat reflecting material 604, 606 within an adhesive material provides a release coating for concrete contacting the adhesive material. Of course, additional release coatings can be applied to the adhesive material. Concrete release coatings are well known in the art.

The insulated concrete form 600 is used in the same manner as the insulated concrete form 100, described above.

Figure 18:
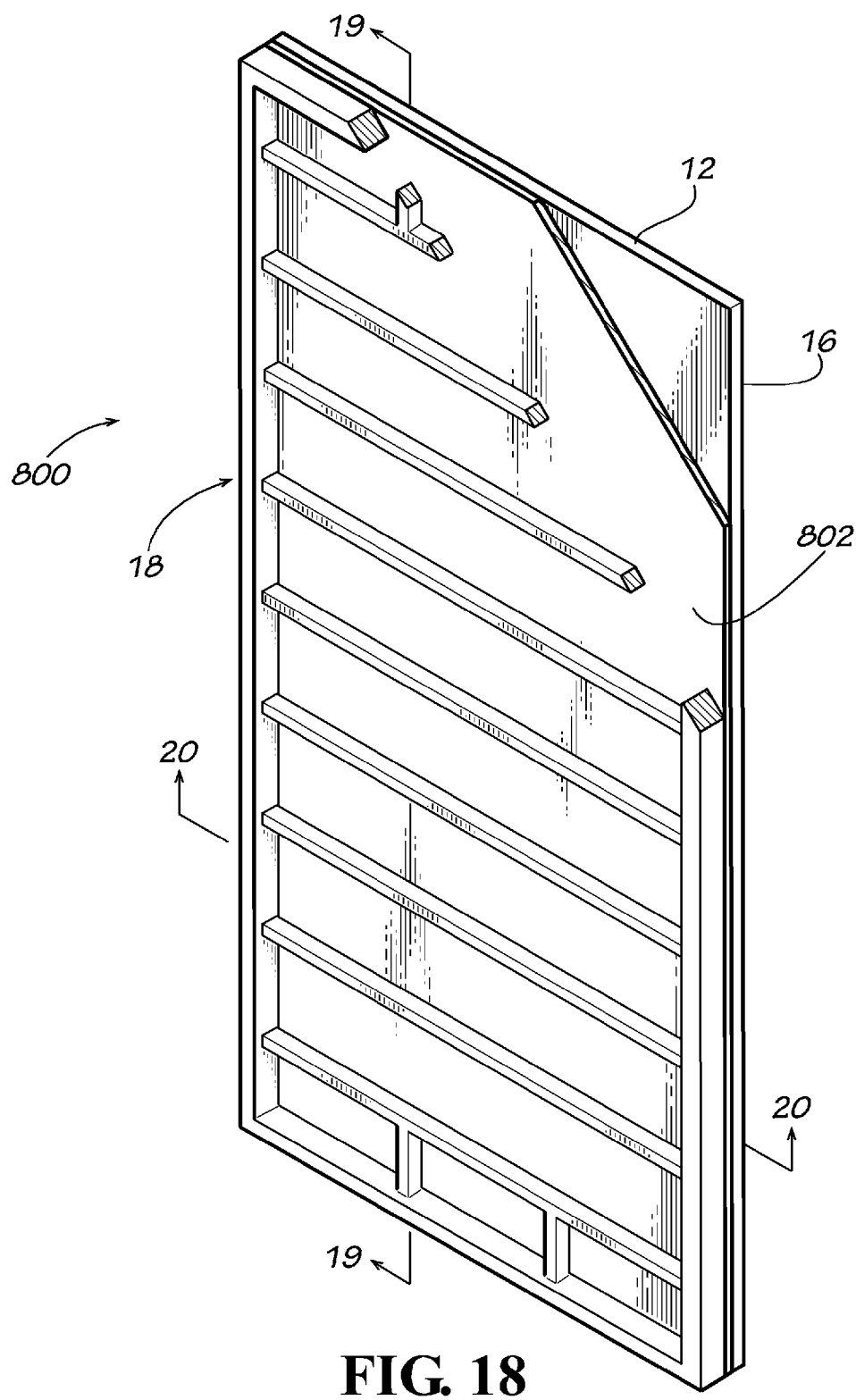
FIG. 18 is a partially broken away perspective view of another disclosed embodiment of an insulated concrete form in accordance with the present invention.

With reference to FIGS. 18-20, there is shown an alternate disclosed embodiment of an insulated concrete form 800 in accordance with the present invention. The insulated concrete form 800 is identical to the concrete form 10, except a layer of radiant heat reflecting material 802 is attached to the second primary surface 16 of the face panel 12. The layer of radiant heat reflecting material 802 is identical to the layer of radiant heat reflecting material 124, as described above. The layer of radiant heat reflecting material 802 covers, or substantially covers, the second primary surface 16 of the face panel 12. The layer of radiant heat reflecting material 802 is attached to the second primary surface 16 of the face panel 12 with any suitable adhesive, such as a contact adhesive, an acrylic adhesive or an epoxy adhesive.

The insulated concrete form 800 is used in the same manner as the insulated concrete form 100, described above.

With reference to FIGS. 21-22, there is shown an alternate disclosed embodiment of an insulated concrete form 900 in accordance with the present invention. The insulated concrete form 900 is identical to the concrete form 10, except a layer of insulating material 902 is attached to the second primary surface 16 of the face panel 12. The layer of insulating material 902 is identical to the layer of insulating material 202, as described above. The layer of insulating material 902 covers, or substantially covers, the second primary surface 16 of the face panel 12. The layer of insulating material 902 is attached to the second primary surface 16 of the face panel 12 with any suitable adhesive, such as a contact adhesive, an acrylic adhesive or an epoxy adhesive.

The insulated concrete form 900 is used in the same manner as the insulated concrete form 100, described above.

With reference to FIGS. 23-24, there is shown an alternate disclosed embodiment of an insulated concrete form 1000 in accordance with the present invention. The insulated concrete form 1000 is identical to the insulated concrete form 800, except both a layer of insulating material 1002 and one or more layers of radiant heat reflecting material 1004, 1006 are substituted for the single layer of radiant heat reflective material 124, as used in the insulated concrete form 800. It is preferred that both layers of radiant heat reflecting material 1004, 1006 be used. The layer of insulating material 1002 is identical to the layer of insulating material 202, as described above. Similarly, the layers of radiant heat reflecting material 1004, 1006 are each identical to the layer of radiant heat reflective material 124, as described above. If the layer of radiant heat reflective material 1004 is used, the layer of radiant heat reflective material 1004 is attached to the second primary surface 16 of the face panel 12 with any suitable adhesive, such as with a contact adhesive, an acrylic adhesive or an epoxy adhesive; the layer of insulating material 1002 is attached to the layer of radiant heat reflective material 1004 with any suitable adhesive, such as with a contact adhesive, an acrylic adhesive or an epoxy adhesive. If the layer of radiant heat reflective material 1004 is not used, the layer of insulating material 1002 is attached to the second primary surface 16 of the face panel 12 with any suitable adhesive, such as with a contact adhesive, an acrylic adhesive or an epoxy adhesive. If the layer of radiant heat reflective material 1006 is used, it is attached to the layer of insulating material 1002 with any suitable adhesive, such as with a contact adhesive, an acrylic adhesive or an epoxy adhesive. The layer of insulating material 1002 and the one or more layers of radiant heat reflecting material 1004, 1006 cover, or substantially cover, the second primary surface 16 of the face panel 12.

The insulated concrete form 1000 is used in the same manner as the insulated concrete form 100, described above.

It is known in the industry that the plywood that contacts the plastic concrete; i.e., the face panel, must be periodically replaced. Therefore, for the embodiments shown in FIGS. 4-10, 16-17 and 23-24, it is desirable to make the face panel removable from the insulating material and/or from the radiant heat reflective material. By doing so, the face panel can be replaced without replacing the insulating material and/or the radiant heat reflective material. This can be done by screwing or bolting the first (or face) panel to the frame separately from the second (or rear) panel, if present. For example, in the embodiments shown in FIGS. 4-10, the first panel 110 can be attached to the frame 18 separately from the second panel 118, so that the first panel can be replaced without replacing the second panel, the layer of radiant heat reflective material 124, 304, 306 and/or the layer of insulating material 202, 302. Alternatively, for the embodiments shown in FIGS. 4-10, it is also contemplated that the layer(s) of radiant heat reflective material, such as 124, 304, 306, and/or the layer of insulating material, such as 202, 302, can be laminated between the layers of plywood, such as between the first and second panels 110, 118, thereby forming a single composite laminated insulated panel structure.

While the present invention can be used with conventional concrete mixes; i.e., concrete in which portland cement is the only cementitious material used in the concrete, it is preferred as a part of the present invention to use the concrete or mortar mixes disclosed in U.S. Pat. No. 8,545,749 (the disclosure of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. Aggregate usually comprises 70% to 80% by volume of the concrete. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement. The range of 0% to approximately 100% by weight portland cement includes all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material can comprise approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention also comprises 0% to approximately 80% by weight fly ash, preferably approximately 10% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 80% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 80% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

The cementitious material for use in one disclosed embodiment of the present invention can optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

The cementitious material for use in one disclosed embodiment of the present invention can also optionally include inert fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 5% to approximately 30% by weight. In one disclosed embodiment, the cementitious material for use with the present invention comprises 0% to approximately 100% by weight portland cement, approximately 10% to approximately 90% by weight slag cement, approximately 5% to approximately 80% by weight fly ash and 0% to approximately 40% by weight inert filler. In another disclosed embodiment, the cementitious material for use with the present invention comprises approximately 10% to approximately 100% by weight portland cement; at least one of approximately 10% to approximately 90% by weight slag cement and approximately 5% to approximately 80% by weight fly ash; and 5% to approximately 40% by weight inert filler.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 100% by weight Portland cement, approximately 10% to approximately 90% by weight slag cement, and approximately 5% to approximately 80% by weight fly ash. In one disclosed embodiment, the cementitious material for use with the present invention comprises approximately 10% to approximately 80% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 70% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 60% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 50% by weight Portland cement, approximately 10% to approximately 90% by weight slag cement, and approximately 5% to approximately 80% by weight fly ash. In another disclosed embodiment, the cementitious material for use with the present invention comprises less than 50% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 45% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 40% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 35% by weight Portland cement, approximately 10% to approximately 90% by weight slag cement, and approximately 5% to approximately 80% by weight fly ash.

In one disclosed embodiment, the cementitious material for use with the present invention comprises 0% to approximately 100% by weight Portland cement, approximately 10% to approximately 90% by weight slag cement, and approximately 5% to approximately 80% by weight fly ash. In one disclosed embodiment, the cementitious material for use with the present invention comprises 0% to approximately 80% by weight Portland cement, approximately 10% to approximately 90% by weight slag cement, and approximately 5% to approximately 80% by weight fly ash. In another disclosed embodiment, the cementitious material for use with the present invention comprises 0% to approximately 70% by weight Portland cement, approximately 10% to approximately 90% by weight slag cement, and approximately 5% to approximately 80% by weight fly ash. In another disclosed embodiment, the cementitious material for use with the present invention comprises 0% to approximately 60% by weight Portland cement, approximately 10% to approximately 90% by weight slag cement, and approximately 5% to approximately 80% by weight fly ash. In another disclosed embodiment, the cementitious material for use with the present invention comprises 0% to approximately 50% by weight Portland cement, approximately 10% to approximately 90% by weight slag cement, and approximately 5% to approximately 80% by weight fly ash. In another disclosed embodiment, the cementitious material for use with the present invention comprises 0% to approximately 45% by weight Portland cement, approximately 10% to approximately 90% by weight slag cement, and approximately 5% to approximately 80% by weight fly ash. In another disclosed embodiment, the cementitious material for use with the present invention comprises 0% to approximately 40% by weight Portland cement, approximately 10% to approximately 90% by weight slag cement, and approximately 5% to approximately 80% by weight fly ash. In another disclosed embodiment, the cementitious material for use with the present invention comprises 0% to approximately 35% by weight Portland cement, approximately 10% to approximately 90% by weight slag cement, and approximately 5% to approximately 80% by weight fly ash.

In another disclosed embodiment, the cementitious material for use with the present invention comprises approximately 10% to approximately 100% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 90% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 80% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 70% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 60% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 50% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 40% by weight Portland cement and at least one of approximately 10% to approximately 90% by weight slag cement and approximately 5% to approximately 80% by weight fly ash.

In another disclosed embodiment, the cementitious material for use with the present invention comprises approximately 10% to approximately 90% by weight Portland cement; approximately 10% to approximately 90% by weight slag cement; 0% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight Portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight Portland cement, approximately 10% to approximately 90% by weight slag cement or approximately 5% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight Portland cement; at least one of approximately 10% to approximately 90% by weight slag cement or approximately 5% to approximately 80% by weight fly ash; and 0.1% to 10% by weight Wollastonite. In one disclosed embodiment, the cementitious material for use with the present invention comprises approximately 10% to approximately 80% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 70% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 60% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 50% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises less than 50% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 45% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 40% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 35% by weight Portland cement; at least one of approximately 10% to approximately 90% by weight slag cement or approximately 5% to approximately 80% by weight fly ash; and 0.1% to approximately 10% by weight Wollastonite.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or supplementary cementitious materials (SCMs) can also be used with the concrete of the present invention. Such mineral admixtures include, but are not limited to, silica fume; metakaolin; rice hull (or rice husk) ash; ground burnt clay bricks; brick dust; bone ash; animal blood; clay; other siliceous, aluminous or alumino-siliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. Although mineral admixtures can be used with the concrete of the present invention, it is believed that mineral admixtures are not necessary.

The concrete mix cured in an insulated concrete form in accordance with the present invention, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at three to seven days the concrete mix cured in accordance with the present invention has a compressive strength at least 50% greater than the same concrete mix would have after the same amount of time in a conventional (i.e., non-insulated) concrete form under ambient conditions. In another disclosed embodiment, the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement, slag cement and fly ash in amounts such that at three to seven days the concrete mix cured in accordance with the present invention has a compressive strength at least 25% or at least 50% greater than the same concrete mix would have after three days in a conventional concrete form under ambient conditions. In another disclosed embodiment the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and slag cement in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment, the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and fly ash in amounts such that at three to three to seven days the concrete mix cured in accordance with the present invention has a compressive strength at least 25% or at least 50% greater than the same concrete mix would have after the same time period in a conventional concrete form under ambient conditions. In another disclosed embodiment the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

The present invention can be used to form any type of concrete structure or object, either cast in place or precast. The present invention can be used to form footings, retaining walls, exterior walls of buildings, load-bearing interior walls, columns, piers, parking deck slabs, elevated slabs, roofs, bridges, or any other structures or objects. Also, the present invention can be used to form precast structures or objects, tilt-up concrete panels for exterior walls of buildings, load-bearing interior walls, columns, piers, parking deck slabs, elevated slab, roofs and other similar precast structures and objects. Additionally, the present invention can be used to form precast structures including, but not limited to, walls, floors, decking, beams, railings, pipes, vaults, underwater infrastructure, modular paving products, retaining walls, storm water management products, culverts, bridge systems, railroad ties, traffic barriers, tunnel segments, light pole beams, light pole bases, transformer pads, and the like.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A product comprising:
   an insulated, removable concrete form for substantially retaining the heat of hydration of hydraulic cement comprising:
   a first concrete forming panel of wood or plywood having a first primary surface adapted for forming and contacting plastic concrete and releasing hardened concrete and a second primary surface opposite the first primary surface, wherein the first concrete forming panel defines a plane;
   a concrete release coating on the first primary surface of the first concrete forming panel;
   a second panel having a first primary surface and a second primary surface opposite the first primary surface;
   a continuous layer of insulating material contacting the second primary surface of the first concrete forming panel and the second primary surface of the second panel, the layer of insulating material substantially covering the second primary surface of the first concrete forming panel, wherein the layer of insulating material has an R-value of greater than 8; and
   a concrete form frame disposed on and contacting the first primary surface of the second panel, the concrete form frame comprising a plurality of bracing members oriented transversely with respect to the first primary surface of the second panel, the frame providing sufficient reinforcement to the first concrete forming panel such that the first concrete forming panel withstands the hydrostatic pressure of plastic concrete contacting the first primary surface, wherein no portion of the concrete form frame is in the plane defined by the first concrete forming panel;
   a quantity of plastic concrete contacting the first primary surface of the first concrete forming panel; and
   wherein the insulated, removable concrete form is removable from the quantity of plastic concrete after the quantity of plastic concrete has cured to a desired degree.

2. The concrete form of claim 1, wherein the layer of insulating material comprises refractory insulating material.

3. The concrete form of claim 2, wherein the refractory insulating material comprises Wollastonite.

4. The concrete form of claim 2, wherein the refractory insulating material comprises ceramic fibers in a polymer.

5. The concrete form of claim 1, wherein the layer of insulating material has an R-value of greater than 12.

6. A product comprising:
   an insulated, removable concrete form for substantially retaining the heat of hydration of hydraulic cement comprising:

a first panel of wood or plywood having a first primary surface and a second primary surface opposite the first primary surface, wherein the first panel defines a plane;

a concrete release coating on the first primary surface of the first panel;

a second panel having a first primary surface and a second primary surface opposite the first primary surface;

a continuous layer of insulating material disposed between the second primary surface of the first panel and the second primary surface of the second panel, the layer of insulating material substantially covering the second primary surface of the first panel, the second primary surface of the first panel and the second primary surface of the second panel facing the layer of insulating material, wherein the layer of insulating material has an R-value of greater than 8; and a concrete form frame disposed on and contacting the first primary surface of the second panel, the concrete form frame comprising a plurality of bracing members oriented transversely with respect to the first primary surface of the second panel, wherein no portion of the concrete form frame is in the plane defined by the first panel;

a quantity of plastic concrete contacting the first primary surface of the first panel; and wherein the insulated, removable concrete form is removable from the quantity of plastic concrete after the quantity of plastic concrete has cured to a desired degree.

7. The concrete form of claim 6, wherein the layer of insulating material has an R-value of greater than 12.

8. The concrete form of claim 6, wherein the layer of insulating material comprises refractory insulating material.

9. The concrete form of claim 8, wherein the refractory insulating material comprises ceramic fibers in a polymer.

10. A product comprising:
an insulated, removable concrete form for substantially retaining the heat of hydration of hydraulic cement comprising:
a first panel of wood or plywood having a first primary surface and a second primary surface opposite the first primary surface, wherein the first panel defines a plane;

a concrete release coating on the first primary surface of the first panel;

a second panel having a first primary surface and a second primary surface opposite the first primary surface;

a continuous layer of insulating material disposed between the second primary surface of the first panel and the second primary surface of the second panel, the layer of insulating material substantially covering the second primary surface of the first panel, the second primary surface of the first panel and the second primary surface of the second panel facing the layer of insulating material, wherein the layer of insulating material has an R-value of approximately 4 to approximately 40; and a concrete form frame disposed on and contacting the first primary surface of the second panel, the concrete form frame comprising a plurality of bracing members oriented transversely with respect to the first primary surface of the second panel, wherein no portion of the concrete form frame is in the plane defined by the first panel;

a quantity of plastic concrete contacting the first primary surface of the first panel; and wherein the insulated, removable concrete form is removable from the quantity of plastic concrete after the quantity of plastic concrete has cured to a desired degree.

* * * * *